(12) United States Patent
Kaneko et al.

(10) Patent No.: US 9,985,754 B2
(45) Date of Patent: May 29, 2018

(54) INFORMATION PROCESSING APPARATUS AND COMMUNICATION DEVICE

(71) Applicant: KABUSHIKI KAISHA TOSHIBA, Tokyo (JP)

(72) Inventors: Yu Kaneko, Kanagawa (JP); Tomonori Maegawa, Tokyo (JP); Keisuke Mera, Kanagawa (JP); Masashi Ito, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 14/833,662

(22) Filed: Aug. 24, 2015

(65) Prior Publication Data

US 2016/0056925 A1 Feb. 25, 2016

(30) Foreign Application Priority Data

Aug. 25, 2014 (JP) ................................. 2014-170785

(51) Int. Cl.
*H04L 29/06* (2006.01)
*H04L 1/18* (2006.01)

(52) U.S. Cl.
CPC ........ *H04L 1/1867* (2013.01); *H04L 63/0281* (2013.01); *H04L 63/062* (2013.01);
(Continued)

(58) Field of Classification Search
None
See application file for complete search history.

(56) References Cited

U.S. PATENT DOCUMENTS 6,367,013 B1* 4/2002 Bisbee .................. G06Q 20/00
    713/158
8,316,237 B1* 11/2012 Felsher ................. H04L 9/0825
    380/282

(Continued)

FOREIGN PATENT DOCUMENTS

JP 2005-101883 4/2005
JP 2007-109209 4/2007

(Continued)

OTHER PUBLICATIONS

Faldella, E.; Prandini, M. An Application of Efficient Certificate Status Handling Methods to High Traffic Authentication Services. Eighth IEEE International Symposium on Computers and Communication, 2003 (ISCC 2003). Pub. Date: 2003. http://ieeexplore.ieee.org/stamp/stamp.jsp?tp=&arnumber=1214219.*

(Continued)

*Primary Examiner* — Jeremiah Avery
(74) *Attorney, Agent, or Firm* — Nixon & Vanderhye, P.C.

(57) ABSTRACT

An information processing apparatus comprises a first circuitry and a second circuitry. The first circuitry first/second demand response requests from first/second communication devices. The second circuitry creates first request content information representing contents of the first demand response request, sends it to a time-stamping authority, and acquires first time certification information containing a time stamp that the time-stamping authority issues for the first demand response request. The second circuitry stores the first time certification information in a storage device to be associates with the first demand response request; and determine, when the second demand response request is received, whether the second demand response request is retransmission of the first demand response request. When it is the retransmission, the second circuitry causes the first (Continued)

circuitry to send the second demand response request and the first time certification information associated with it in the storage device, to a second communication device.

19 Claims, 16 Drawing Sheets

(52) U.S. Cl.
CPC ........ *H04L 63/123* (2013.01); *H04L 63/0442* (2013.01); *H04L 2463/121* (2013.01)

(56) References Cited

U.S. PATENT DOCUMENTS

| | | | |
|---|---|---|---|
| 2003/0097570 A1* | 5/2003 | Wheeler | G06F 21/32 713/180 |
| 2003/0097573 A1* | 5/2003 | Wheeler | G06Q 20/4014 713/182 |
| 2005/0102499 A1 | 5/2005 | Kosuga et al. | |
| 2005/0198170 A1 | 9/2005 | LeMay et al. | |
| 2007/0027821 A1 | 2/2007 | Voyer et al. | |
| 2008/0120240 A1* | 5/2008 | Ginter | G06F 21/10 705/51 |
| 2010/0011214 A1* | 1/2010 | Cha | G06F 21/725 713/175 |
| 2013/0159021 A1* | 6/2013 | Felsher | G06F 19/322 705/3 |
| 2014/0046836 A1 | 2/2014 | Kaneko et al. | |
| 2015/0012974 A1* | 1/2015 | Unitt | H04L 63/08 726/4 |

FOREIGN PATENT DOCUMENTS

| | | |
|---|---|---|
| JP | 2011-072042 | 4/2011 |
| JP | 2014-035745 | 2/2014 |

OTHER PUBLICATIONS

Morigaki, Tsutomu; Matsuura, Kanta; Sudo, Osamu. An Analysis of Detailed Electronic Time-Stamping Using Digital TV. 2004 IEEE International Conference on e-Technology, e-Commerce and e-Service, 2004. EEE '04. Pub. Date: 2004. http://ieeexplore.ieee.org/stamp/stamp.jsp?tp=&arnumber=1287323.*

* cited by examiner

```
<oadr:oadrDistributeEvent ei:schemaVersion="2.0b">
   <pyld:requestID>REQ_12345</pyld:requestID>
   <ei:vtnID>VTN_543</ei:vtnID>
   <oadr:oadrEvent>
       <ei:eiEvent>
        <ei:eventDescriptor>
          <ei:eventID>event12345</ei:eventID>
          <ei:modificationNumber>0</ei:modificationNumber>
          <ei:modificationDateTime>2001-12-17T09:30:47Z</ei:modificationDateTime>
          <ei:createdDateTime>2001-12-17T09:30:47Z</ei:createdDateTime>
          <ei:eventStatus>far</ei:eventStatus>
        </ei:eventDescriptor>
        <ei:eiActivePeriod>
         <xcal:properties>
          <xcal:dtstart>
              <xcal:date-time>2001-12-17T09:30:47Z</xcal:date-time>
          </xcal:dtstart>
          <xcal:duration>
              <xcal:duration>PT5M</xcal:duration>
          </xcal:duration>
              :
```

FIG. 4

| SENDING SERVER ID | RECEIVING SERVER ID | HASH VALUE | TOKEN | TERM OF VALIDITY |
|---|---|---|---|---|
| send.server1 | recv.server1 | 38a7d9f87e1 | x93hpc | 2014-04-02T16:00:00 |
| send.server1 | recv.server2 | 56c89fa6a7 | y16gqd | 2014-04-02T16:00:00 |
| send.server2 | recv.server1 | e8f776ab24 | z47fre | 2014-04-15T09:00:00 |

FIG. 5

INFORMATION PROCESSING APPARATUS AND COMMUNICATION DEVICE

CROSS-REFERENCE TO RELATED APPLICATIONS

This application is based upon and claims the benefit of priority from Japanese Patent Application No. 2014-170785, filed Aug. 25, 2014; the entire contents of which are incorporated herein by reference.

FIELD

Embodiments described herein relate to an information processing apparatus and a communication device.

BACKGROUND

Demand response (DR) is a method in which a power supplier requests a power consumer to adjust the amount of power consumption, to adjust a balance between the supply and the demand of power. Hereafter, a demand response request being the adjustment request of the amount of power consumption will be referred to as a DR request. When receiving a DR request, the power consumer acts according to the content of this DR request. For example, if the contents of the DR request indicate the reduction of the amount of power consumption during the period from 12:00 to 14:00 tomorrow, the power consumer takes an action such as stopping an air conditioner from 12:00 to 14:00 tomorrow. As described, a period during which the adjustment of the amount of power consumption is needed will be referred to as a DR target period.

In recent years, methods of sending a DR request via the Internet (DR protocol) have been standardized. These DR protocols include, for example, Open Automated Demand Response (OpenADR). To perform a DR using the DR protocol, the power supplier prepares a system to send a DR request, and the power consumer prepares a system to receive the DR request.

Before performing a demand response, the power supplier (the sender of a DR request) and the power consumer (the receiver of the DR request) make a demand response contract (hereafter, referred to as a DR contract). Commonly, the validity or invalidity of the DR request is determined based on the sending time of the DR request, thereby the sending time is important for both the power supplier and the power consumer. If the DR request becomes invalid, the plan of electric power adjustment that the power supplier has created in advance is to be miscarried. In addition, if the DR request becomes invalid, the power consumer does not need to adjust the amount of power consumption.

Thus the validity or the invalidity of a DR request has impacts on the actions of both the power supplier and the power consumer. To achieve the adjustment of the amount of power consumption by appropriate actions of the power supplier and the power consumer, a scheme that certify the sending time of the DR request for both parties is necessary.

If a DR request could not reach the power consumer by a communication network failure, the power suppler retransmits the DR request. If the validity or the invalidity of the DR request is determined based on a sending time at which this DR request is first sent (hereafter, referred to as a first sending time), this first sending time is important for both the power supplier and the power consumer. Unfortunately, there is a problem with the retransmission of a DR request in that it is difficult to certify the first sending time.

BRIEF DESCRIPTION OF THE DRAWINGS

FIG. 4 is a diagram showing a part of a DR request of OpenADR;

FIG. 5 is a diagram showing an example of information recorded in a storage device 25;

DETAILED DESCRIPTION

According to one embodiment, an information processing apparatus a first circuitry and a second circuitry. The first circuitry is configured to receive a first demand response request from a first communication device, and receive a second demand response request from the first communication device after receiving the first demand response request.

The second circuitry is configured to create first request content information representing contents of the first demand response request, from the first demand response request.

The second circuitry is configured to send the first request content information to a time-stamping authority, and acquire first time certification information that the time-stamping authority sends in response to this sending, the first time certification information containing a time stamp that the time-stamping authority issues for the first demand response request.

The second circuitry is configured to associate the first time certification information with the first demand response request and store the first time certification information in a storage device.

The second circuitry is configured to determine, when the second demand response request is received by the first circuitry, whether the second demand response request is retransmission of the first demand response request.

The second circuitry is configured to, when the second circuitry determines that the second demand response request is the retransmission of the first demand response request, causes the first circuitry to send the second demand response request and the first time certification information associated with the first demand response request in the storage device, to a second communication device.

Below, embodiments of the present invention will be described with reference to the drawings.

First Embodiment

Figure 1:
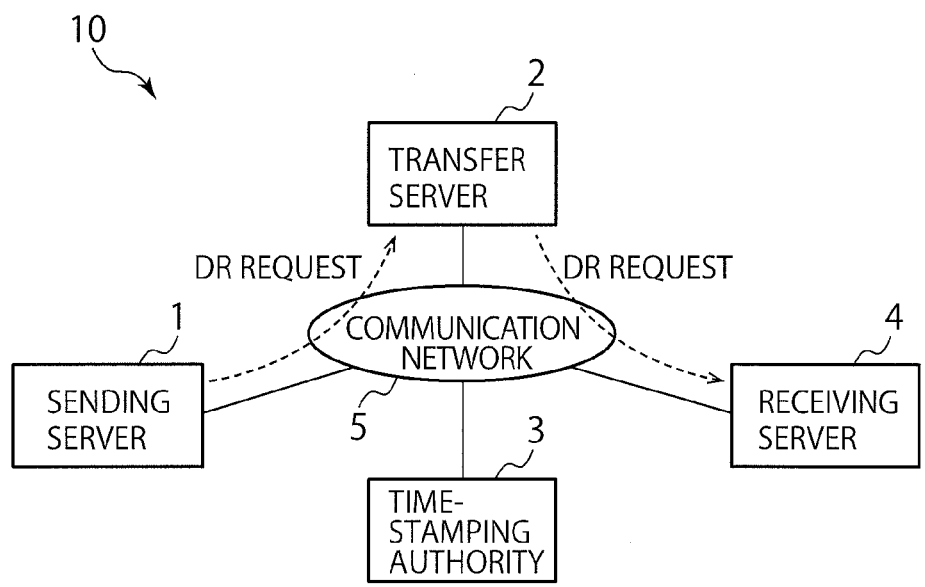
FIG. 1 is a diagram showing the configuration of an information processing system 10 in a first embodiment.

A first embodiment will be described first. FIG. 1 is diagram showing the configuration of an information processing system 10 in the first embodiment. As shown in FIG. 1, the information processing system 10 includes a sending server (a first communication device) 1, a transfer server (an information processing apparatus) 2, a time-stamping authority 3, and a receiving server (a second communication device) 4.

The sending server 1 sends a DR request to the transfer server 2 through a communication network 5.

The transfer server 2 transfers the DR request that is received from the sending server 1 to the receiving server 4 through the communication network 5.

The receiving server 4 receives the DR request from the transfer server 2 through the communication network 5.

The time-stamping authority (TSA) 3 issues a time stamp (TS) in response to a request. More specifically, for example, the time-stamping authority 3 issues the time stamp based on time information distributed from a time assessment authority (TAA) when receiving a request includes a hash value. The TSA 3 encrypts then the time stamp and the hash value by using a private key of the TSA 3, and creates a token which includes the encrypted time stamp and the encrypted hash value. The token is an example of time certification information containing a time stamp that the TSA 3 issues in response to a demand response request.

The sending server 1 and the receiving server 4 can trust the time stamp because the TSA is a trusted third party.

Hereafter, "hash(m)" denotes a hash value of an input "m". In addition, "ts(hv)" denotes a time stamp issued by the time-stamping authority 3 in response to a hash value "hv". In addition, "token(hv, ts)" denotes a token created from the hash value "hv" and a time stamp "ts". For example, if hv=hash(m), token(hv, ts)=token(hash(m), ts(hv))=token(hash(m), ts(hash(m))).

Note that, each server may be a system configured by a plurality of servers and networks. In addition, it is assumed in the present embodiment that the number of sending servers in the information processing system 10 is one as an example, but the number is not limited to one and may be two or more.

Similarly, it is assumed in the present embodiment that the number of receiving servers in the information processing system 10 is one as an example, but the number is not limited to one and may be two or more. For example, the receiving server can be present in each structure such as a building and a house. It is assumed in the present embodiment that the time-stamping authority 3 and the transfer server 2 are connected by the communication network 5 as an example, but the connection is not limited to this and the time-stamping authority 3 and the transfer server 2 may be connected by a private line.

Figure 2:
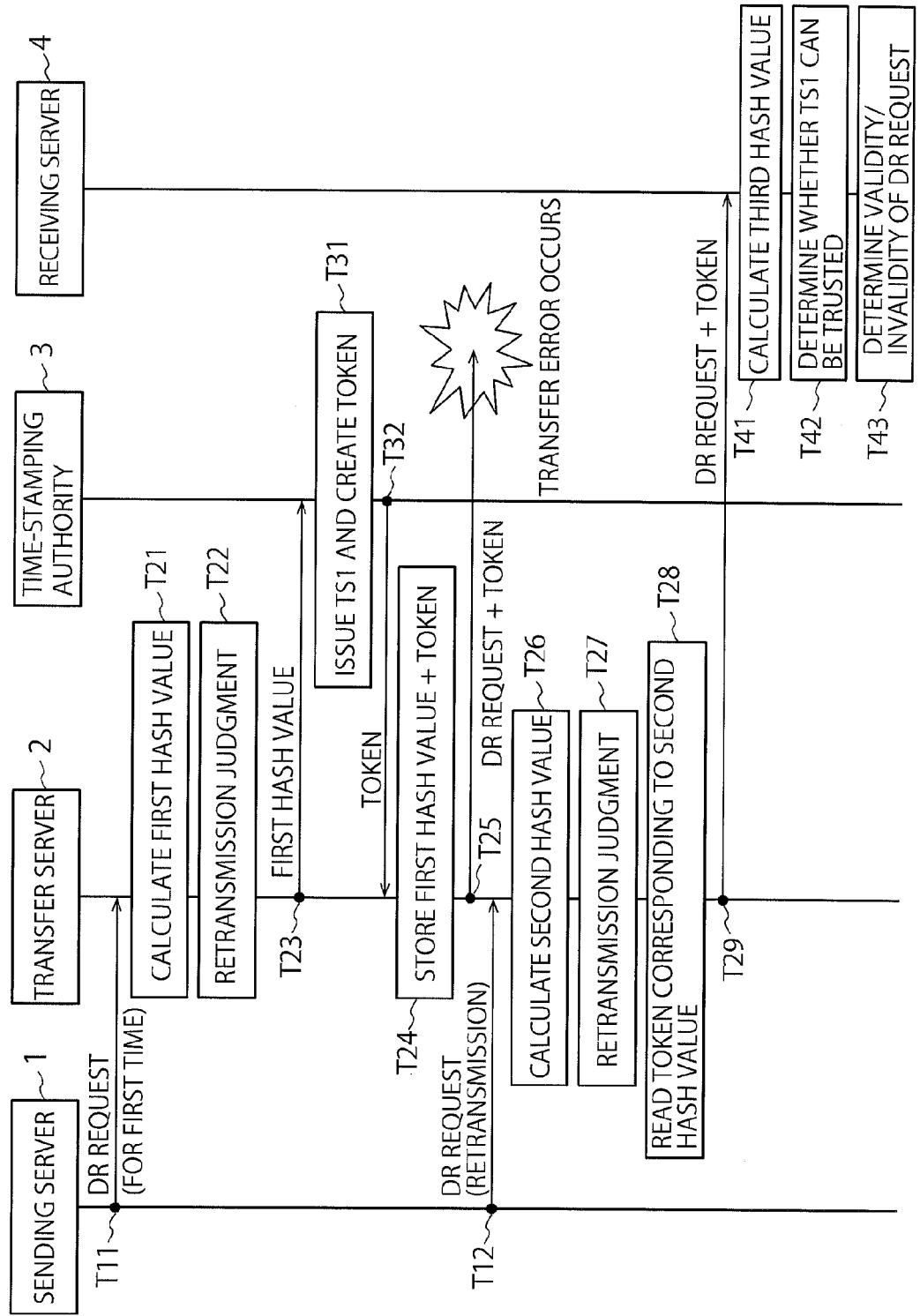
FIG. 2 is a sequence diagram showing an example of a process of transferring a DR request in the first embodiment.

Subsequently, the outline of transferring process of a DR request in the first embodiment is described below with reference to FIG. 2. FIG. 2 is a sequence diagram showing an example of the transferring process of a DR request in the first embodiment.

(T11) First, the sending server 1 sends a DR request to the transfer server 2. This sending of the DR request is the first time sending.

(T21) Next, the transfer server 2 extracts, from the DR request, definition information that defines this DR request. Then the transfer server 2 formats this definition information so as to match a predetermined format. This formatting corrects fluctuations of expression of the definition information and an order of appearance of information. After the formatting process, the transfer server 2 calculates a first hash value from the formatted definition information.

(T22) Next, the transfer server 2 determines whether this DR request is a retransmitted one. This DR request is determined not to be a retransmitted one.

(T23) Since the DR request is not a retransmitted one, the transfer server 2 sends the first hash value calculated in T21 to the TSA 3.

(T31) Next, when receiving the first hash value from the transfer server 2, the TSA 3 issues a time stamp TS1. The TSA 3 then creates a token to certificate this time stamp TS1 based on the first hash value and the time stamp TS1.

The token is, for example, the combination of the first hash value and the time stamp TS1 encrypted with a private key of the public-key crypto method.

(T32) Next, the TSA 3 sends the token created in T31 to the transfer server 2.

(T24) Next, when receiving the token from the TSA 3, the transfer server 2 associates the first hash value with the received token and stores them in a storage device.

(T25) Next, the transfer server 2 sends the DR request and the token towards the receiving server 4. This example assumes the case where a fault (transfer error) occurs during this sending.

(T12) When detecting the transfer error, the sending server 1 retransmits the DR request to the transfer server 2.

(T26) Next, the transfer server 2 extracts, from the retransmitted DR request, definition information to define this DR request, formats this definition information so as to match the predetermined format, and calculates a second hash value, which is a hash value of the formatted definition information.

(T27) Next, the transfer server 2 determines whether this DR request is a retransmitted one. In this case, this DR request is determined to be a retransmitted one.

(T28) Next, the transfer server 2 reads a token corresponding to the second hash value from the storage device.

(T29) Next, the transfer server 2 sends the DR request and the read token to the receiving server 4.

(T41) Next, when receiving the DR request and the token, the receiving server 4 extracts the definition information to define this DR request from the received DR request, formats this definition information so as to match the predetermined format, and calculates a third hash value, which is a hash value of the formatted definition information.

(T42) Next, the receiving server 4 determines whether the time stamp TS1 is trustworthy. For example, the receiving server 4 decrypts the token using a public key distributed from the TSA 3, and determines whether the hash value obtained through the decryption matches the third hash value. This public key is paired with the private key which was used to create the token the TSA 3. If the hash value obtained through the decryption matches the third hash value, the receiving server 4 can trust the time stamp TS1 obtained by decrypting the token.

(T43) Next, the receiving server 4 determines the validity/invalidity of the DR request using the time stamp TS1. The process of this sequence is thus finished.

As mentioned above, the receiving server 4 can acquire the time stamp TS1, which is the first sending time of the DR request, even if the DR request is a retransmitted one.

Figure 3:
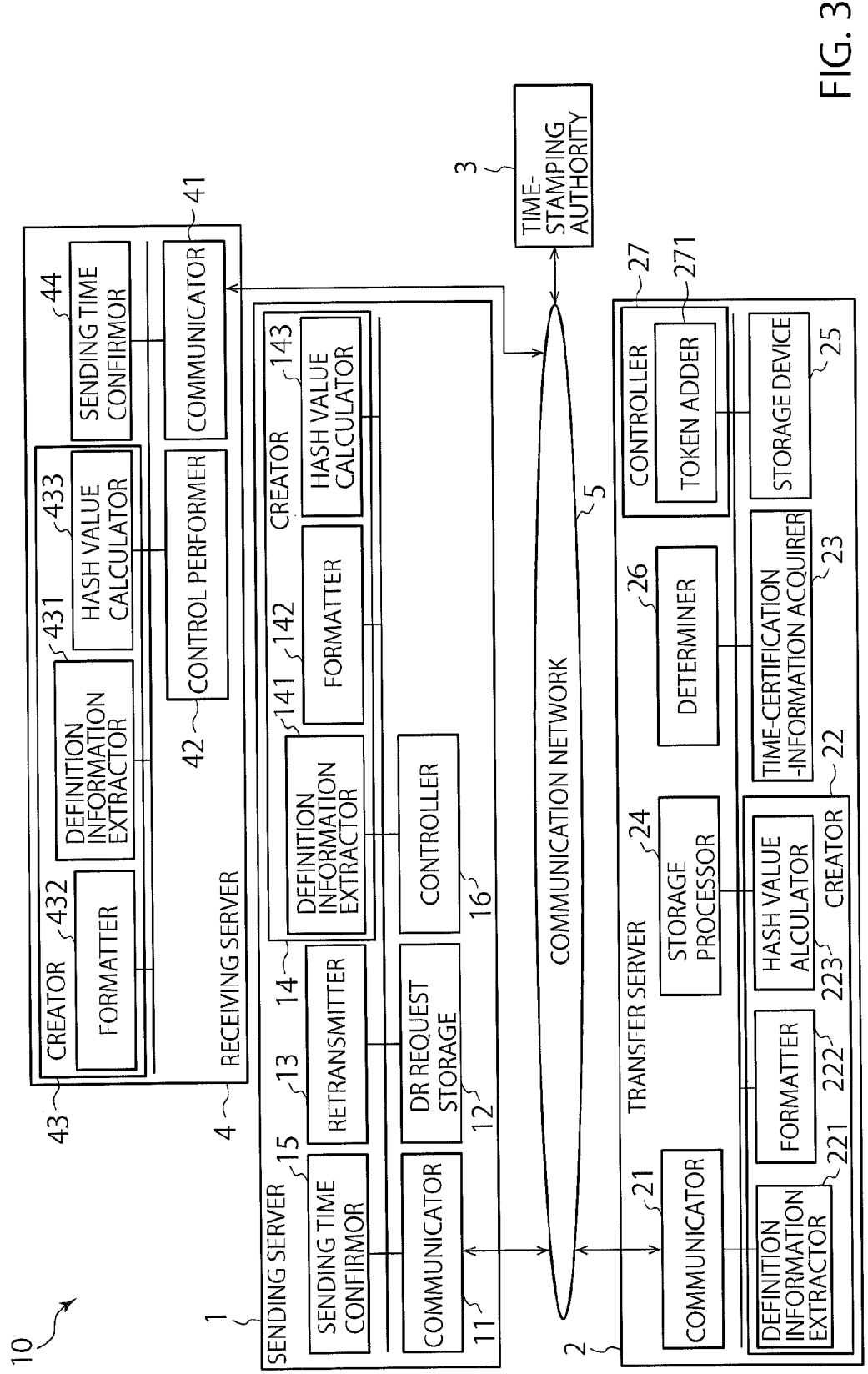
FIG. 3 is a diagram showing in detail the configuration of the information processing system 10 in the first embodiment.

Subsequently, the configuration of the transfer server 2 is described with reference to FIG. 3. FIG. 3 is a diagram showing in detail the configuration of the information processing system 10 in the first embodiment.

As shown in FIG. 3, the transfer server 2 includes a communicator 21, a creator 22, a time-certification-information acquirer 23, a storage processor 24, a storage device 25, a determiner 26, and a controller 27. All or some of the blocks of the transfer server 2 may be configured by one or a plurality of circuitry as one example. As one example, the communicator 21 may be configured by a first circuitry, and the elements 22-27 may be configured by a second circuitry. The first circuitry and the second circuitry may be same physical circuitry or different physical circuitry each other. Other configuration examples than those described herein are possible. The term "circuitry" may indicate one circuit, a plurality of circuits, or a system of circuits.

The communicator 21 communicates with the sending server 1, the TSA 3, and the receiving server 4, through the communication network 5. For example, the communicator 21 receives a first demand response request from the sending server 1, and after the reception of the first demand response request, receives a second demand response request from the sending server 1.

The creator 22 creates request content information that represents the content of this demand response request, from the demand response request. In the present embodiment, the request content information is, as an example, the hash value of the formatted definition information. Note that the request content information may be information to determine the content of a DR request such as the combination of the DR target time and the amount of energy savings, and may be any information as long as the information can determine the content of the DR request.

For example, the creator 22 creates, based on the first demand response request (e.g., the DR request of the first time of FIG. 2), first request content information representing the content of the first demand response request (e.g., the first hash value of FIG. 2). In addition, for example, when the second demand response request (e.g., the DR request in retransmission in FIG. 2) is received by the communicator 21, the creator 22 creates second request content information that represents the content of the second demand response request (e.g., the second hash value of FIG. 2), from the second demand response request.

Here, the creator 22 includes a definition information extractor 221, a formatter 222, and a hash value calculator 223.

The definition information extractor 221 extracts, from the DR request received by the communicator 21, definition information that is the collection of pieces of information to define the DR request. For this reason, when, for example, the communicator 21 receives the first demand response request, the definition information extractor 221 extracts first definition information to define the first demand response request. Similarly, for example, when the communicator 21 receives the second demand response request, the definition information extractor 221 extracts second definition information to define the second demand response request.

For example, the definition information contains a sending server ID that identifies a sending server being a sending source, a receiving server ID that identifies a receiving server being a destination, a DR type, a DR target period, and the amount of electric power adjustment (e.g., the value of reduction target of electricity charge or the amount of power consumption). These pieces of information are unchanged between in the first sending and in retransmission. If these pieces of information are changed, the DR request is not a retransmission one. The specific contents of the definition information are determined according to a DR protocol.

Information that is contained in the DR request and is not contained in the definition information includes, for example, a message ID and a message creation time. These pieces of information change between in the first sending and in retransmission.

FIG. 4 is a diagram showing a part of a DR request of the OpenADR. Among the pieces of information in FIG. 4, "requestID" and "createdDateTime" are pieces of information that change at every sending and are not contained in the definition information.

In contrast, the other pieces of information are contained in the definition information.

The definition information differs between protocols of the demand response (DR protocol). Thus, there are DR protocols that have the DR sending server ID of a sending source, and DR protocols that do not have the DR sending server ID. To support a plurality of DR protocols, information that should be extracted as the definition information should be defined for each DR protocol. The definition information extractor 221 then changes the information to be extracted according to the DR protocols. This allows the definition information extractor 221 to perform an extracting process according to the DR protocols.

In FIG. 3, the formatter 222 formats the definition information extracted by the definition information extractor 221. For example, when the definition information extractor 221 extracts the first definition information, the formatter 222 formats this first definition information. In addition, for example, when the definition information extractor 221 extracts the second definition information, the formatter 222 formats this second definition information. The content of specific formatting is determined according to the DR protocol. An example of a formatting process will be described below. The formatting process includes sorting of the definition information. Criteria for the sorting vary, including for example the alphabetical order and the Japanese syllabary order. In addition, the formatting process includes deleting newlines in the definition information and/or deleting unnecessary spaces.

Methods of formatting differ according to the DR protocols. For example, the DR protocols include those allowing newlines in information, and those not allowing newlines. If a DR protocol does not allow newlines, the formatter 222 does not need in particular to delete newlines. To support a plurality of DR protocols, the formatting process to be performed may be defined for each DR protocol. The formatter 222 then changes the method of formatting according to the DR protocols. This allows the formatter 222 to perform the formatting process according to the DR protocol. Hereafter, the DR request that has been subjected to both the process by the definition information extractor 221 and the process by the formatter 222 will be denoted by "format" (DR request).

The hash value calculator 223 calculates a hash value taking the DR request or the definition information formatted by the formatter 222 as an input. For example, the hash value calculator 223 calculates the hash value of the formatted first definition information as the first request content information, and calculates the hash value of the formatted second definition information as the second request content information. The hash algorithm includes MD5, SHA1, and SHA2. Extracting the definition information and formatting this definition information prior to the calculation of the hash values make the hash value calculated from the DR request in the first sending identical to the hash value calculated from the DR request in retransmission.

The time-certification-information acquirer 23 acquires the token from the storage device 25 or the TSA 3, using the hash value calculated from the formatted definition information. When the determiner 26 determines that the DR request is a retransmitted one, since a token corresponding to the hash value (a token acquired and recorded in the first sending) should be recorded in the storage device, the time-certification-information acquirer 23 acquires the token from the storage device. In contrast, when the determiner 26 determines that the DR request is not the retransmission one (the DR request in the first sending), the time-certification-information acquirer 23 sends the hash value to the TSA 3 to cause the TSA 3 to create a token, and acquires the token from the TSA 3. When acquiring the token from the TSA 3, the storage processor 24 associates the hash value with the token and records them in the storage device.

For example, the time-certification-information acquirer 23 sends the first request content information (e.g., the first hash value of FIG. 2) to the TSA 3, and acquires first time certification information (e.g., the token of FIG. 2) that the TSA 3 sends in response to this sending from the TSA 3, the first time certification information containing a time stamp that the TSA 3 has issued for the first demand response request.

In the present embodiment, the first time certification information contains, as an example, the values of the first request content information, in addition to the time stamp that the TSA 3 has issued for the first demand response request. As a specific example, the first time certification information is information into which the TSA 3 encrypts the values of the first request content information and the information containing the time stamp that the TSA 3 has issued for the first demand response request. Here, the encryption by the TSA 3 is encryption using a private key in the public-key cryptosystem.

In addition, the time-certification-information acquirer 23 sends the second request content information to the TSA 3, and acquires second time certification information that the TSA 3 sends in response to this sending from the TSA 3, the second time certification information containing a time stamp that the TSA 3 has issued for the second demand response request. This acquisition is performed, for example, in the case where the determiner 26 determines that the second demand response request is not the retransmission of the first demand response request.

In the present embodiment, the second time certification information contains, as an example, the values of the second request content information, in addition to the time stamp that the TSA 3 has issued for the second demand response request. As a specific example, the second time certification information is information into which the TSA 3 encrypts the values of the second request content information and the information containing the time stamp that the TSA 3 has issued for the second demand response request.

The storage processor 24 performs a process of storing the first time certification information (e.g., the token of FIG. 2) in the storage device 25 in such a manner as to associate it with the first demand response request. More specifically, for example, when the first demand response request is received by the communicator 21, the storage processor 24 associates the first request content information (e.g., the first hash value of FIG. 2) with the first time certification information (e.g., the token of FIG. 2), and store them in the storage device 25.

Here, for example, a sending server ID to identify a sending server and a receiving server ID to identify a receiving server are stored together taking into consideration the case where a plurality of sending servers and receiving servers exist. The sending server ID is a value unique to each sending server, and the receiving server ID is a value unique to each receiving server. In addition, a term of validity may be stored together. The storage processor 24 deletes information the term of validity of which has passed. This allows for avoiding information to be stored from increasing. Methods of determining the term of validity vary. For example, the end time of a DR target period specified by the DR request may be determined as the term of validity.

FIG. 5 is a diagram showing an example of information that is recorded in the storage device 25. A table T1 in FIG. 5 shows sets of a sending server ID, a receiving server ID, a hash value, a token, and a term of validity. For example, the sending server ID is "send.server1", the receiving server ID is "recv.server1", the hash value is "38a7d9f87e1", the token is "x93hpc", and the term of validity is "2014-04-02T16:00:00".

In FIG. 3, the determiner 26 determines whether the DR request received by the communicator 21 is a retransmitted one. For example, when the second demand response request (e.g., the DR request in retransmission of FIG. 2) is received by the communicator 21, the determiner 26 determines whether the second demand response request is the retransmission of the first demand response request.

More specifically, for example, the determiner 26 determine whether request content information (e.g., a hash value) identical to the second request content information (e.g., the hash value of FIG. 2) is stored in the storage device 25, to determine whether the second demand response request is the retransmission of the first demand response request. When request content information (e.g., a hash value) identical to the second request content information (e.g., the hash value of FIG. 2) is stored in the storage device 25, the determiner 26 determines that the second demand response request is the retransmission of the first demand response request.

As seen from the above, extracting the definition information and formatting this definition information makes the hash value in the first sending "hash" ("format" (the DR request in the first sending)) identical to the hash value in retransmission "hash" ("format" (the DR request in retransmission)), allowing such retransmission judgment.

In the present embodiment, the description will be made assuming that the retransmission judgment by the determiner 26 uses hash values, taking the following matters into consideration. First, since the hash values have a fixed length regardless of the size of their original data, using hash values brings an advantage of reducing required storage capacity and computational complexity required for comparison. In addition, the calculation of a hash value is for acquiring a token from the TSA 3, which brings an advantage of not causing unnecessary calculation.

Note that, the determiner 26 may perform the retransmission judgment by comparing the original data items of hash values, that is, the pieces of formatted definition information, with each other instead of the hash values. In addition, the determiner 26 may perform the retransmission judgment by comparing the DR requests with each other, instead of the hash values.

When the determiner 26 determines that the DR request is a retransmitted one, the controller 27 causes the communicator 21 to send the second demand response request and the first time certification information stored in the storage device 25 to the receiving server 4. More specifically, for example, when the determiner 26 determines that the second request content information is stored in the storage device 25, the controller 27 reads the first time certification information corresponding to the same request content information as the second request content information from the storage device 25, and causes the communicator 21 to send the read first time certification information to the receiving server 4.

In contrast, when the determiner 26 determines that the DR request is not a retransmitted one, the controller 27 causes the communicator 21 to send the second time certification information acquired by the time-certification-information acquirer 23 and the second demand response request to the receiving server 4.

Here, the controller 27 includes a token adder 271. The token adder 271 adds, for example, a token to an HTTP request or an HTTP response. For example, when the determiner 26 determines that the DR request is a retransmitted one, the token adder 271 adds the DR request and the first time certification information to an HTTP request. The controller 27 then causes the communicator 21 to send the HTTP request after the addition to the receiving server 4. In contrast, when the determiner 26 determines that the DR request is not a retransmitted one, the token adder 271 adds the DR request and the second time certification information to the HTTP request. The controller then causes the communicator 21 to send the HTTP request after the addition to the receiving server 4. Here, a specific method of adding the token is determined according to the DR protocol.

Subsequently, the configuration of the sending server 1 will be described with reference to FIG. 3. As shown in FIG. 3, the sending server 1 includes a communicator 11, a DR request storage 12, a retransmitter 13, a creator 14, a sending time confirmor 15, and a controller 16. All or some of the blocks of the sending server 1 may be configured by one or a plurality of circuitry as one example. As one example, the communicator 11 may be configured by a first circuitry, and the elements 12-16 may be configured by a second circuitry. The first circuitry and the second circuitry may be same physical circuitry or different physical circuitry each other. Other configuration examples than those described herein are possible. The term "circuitry" may indicate one circuit, a plurality of circuits, or a system of circuits.

The communicator 11 communicates with the transfer server 2 through the communication network 5.

The DR request storage 12 stores a DR request to be sent to the receiving server 4.

The retransmitter 13 performs the retransmission process of the DR request, if the retransmission conditions are met. The retransmission conditions include, for example, the case where an HTTP (Hypertext Transfer Protocol) response is not returned from the transfer server although a certain period of time has elapsed, the case where, an IQ result of the XMPP (Extensible Messaging and Presence Protocol) is not returned from a DR transfer server although the certain period of time has elapsed, and the case where a DR response for the DR request is not transferred.

The creator 14 creates, based on the demand response request, request content information to identify this demand response request, as with the creator 22 of the transfer server 2. Here, the creator 14 includes a definition information extractor 141, a formatter 142, and a hash value calculator 143.

The definition information extractor 141 extracts definition information that is the collection of pieces of information to define the DR request from the DR request received by the communicator 11, as with the definition information extractor 221 of the transfer server 2.

The formatter 142 formats, as with the formatter 222 of the transfer server 2, the definition information extracted by the definition information extractor 141.

The hash value calculator 143 calculates a hash value, taking a DR request, or the definition information formatted by the formatter 142 as an input, as with the hash value calculator 223 of the transfer server 2.

The sending time confirmor 15 acquires a time stamp issued for the sent DR request. More specifically, the sending time confirmor 15 acquires from the transfer server 2 the token that the TSA 3 issues for this DR request, and decrypts the acquired token using the public key distributed by the TSA 3 in advance, to acquire the time stamp.

The sending time confirmor 15 then determines the validity/invalidity of the DR request based on the regulation of the DR contract. For example, the sending time confirmor 15 determines the DR request to be valid if the time stamp that the TSA 3 issues for the DR request is earlier than the start time of a DR target period by a predetermined period of time or more, or to be invalid if the time stamp is earlier than the start time by less than the predetermined period of time. Note that if the DR request is determined to be invalid, the sending time confirmor 15 may take measures such as sending another DR request.

The controller 16 controls the communication of the communicator 11 and the reading/writing to the DR request storage 12.

Subsequently, the configuration of the receiving server 4 will be described with reference to FIG. 3. As shown in FIG. 3, the receiving server 4 includes a communicator 41, a control performer 42, a creator 43, and a sending time confirmor 44. All or some of the blocks of the receiving server 4 may be configured by one or a plurality of circuitry as one example. As one example, the communicator 41 may be configured by a first circuitry, and the elements 42-44 may be configured by a second circuitry. The first circuitry and the second circuitry may be same physical circuitry or different physical circuitry each other. Other configuration examples than those described herein are possible. The term "circuitry" may indicate one circuit, a plurality of circuits, or a system of circuits.

The communicator 41 communicates with the transfer server 2 through the communication network 5.

The control performer 42 controls devices (e.g., an air conditioner) based on a DR request received by the communicator 41.

The creator 43 creates, based on the demand response request, request content information to identify this demand response request, as with the creator 22 of the transfer server 2. Here, creator 43 includes a definition information extractor 431, a formatter 432, and a hash value calculator 433.

The definition information extractor 431 extracts, from the DR request received by the communicator 41, definition information that is the collection of pieces of information to define the DR request, as with the definition information extractor 221 of the transfer server 2.

The formatter 432 formats the definition information extracted by the definition information extractor 431, as with the formatter 222 of the transfer server 2.

The hash value calculator 433 calculates a hash value taking the DR request or the definition information formatted by the formatter 432 as an input, as with the hash value calculator 223 of the transfer server 2.

The sending time confirmor 44 acquires the time stamp issued for the received DR request, as with the sending time confirmor 15 of the sending server 1. The sending time confirmor 44 then confirms the validity/invalidity of the DR request based on the regulation of the DR contract. Device control is allowed to be performed by the control performer 42 only if the DR request is valid.

Figure 6:
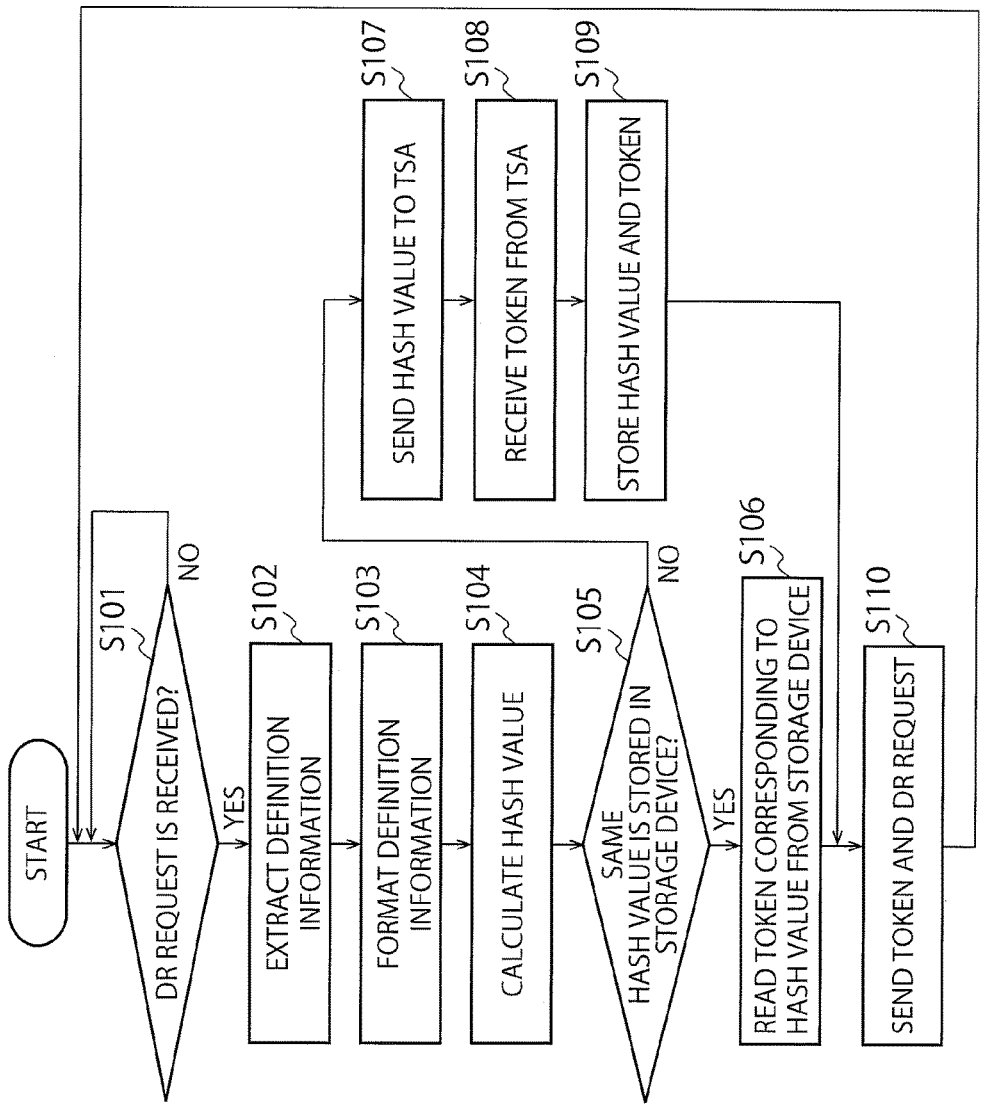
FIG. 6 is a flow chart showing an example of a process of transmitting a time stamp that a time-stamping authority 3 issues for a DR request for the first time.

Process Example of Transmitting a Time Stamp Issued by the TSA 3 for a DR Request at the First Time Subsequently, there will be described a process of transmitting a time stamp that the TSA 3 issues for a DR request at the first time, with reference to FIG. 6. FIG. 6 is a flow chart showing an example of the process of transmitting the time stamp that the TSA 3 issues for a DR request at the first time.

(Step S101) First, the controller 27 determines whether the communicator 21 has received a DR request. If the communicator 21 has received no DR request, the controller 27 remains on standby.

(Step S102) If the communicator 21 is determined to have received a DR request in step S101, the definition information extractor 221 extracts definition information from the DR request received by the communicator 21.

(Step S103) Next, the formatter 222 formats the definition information extracted in step S102. A "format" (DR request) is thereby created.

(Step S104) Next, the hash value calculator 223 calculates a hash value of the formatted definition information. A "hash" ("format" (DR request)) is thereby acquired.

(Step S105) Next, the determiner 26 determines whether any hash value identical to the hash value calculated in step S104 is stored in the storage device 25. More specifically, the determiner 26 determines whether any information whose three items being a sending server ID, a receiving server ID, and a hash value "hash" ("format" (DR request)) match those of the DR request is stored in the storage device 25. If the information having the matching three items is stored in storage device 25, which means that the DR request is a retransmitted one, the process proceeds to step S106. In contrast, if the information having the matching three items is not stored in storage device 25, which means that the DR request is not a retransmitted one, the process proceeds to step S107. Here, the sending server ID and the receiving server ID used therefor may be the respective IDs specified in the DR request, or may be an IP address or a URL of the HTTP.

(Step S106) If it is determined in step S105 that a hash value identical to the calculated hash value is stored in the storage device 25, which means that the DR request received in the step S101 is a retransmitted one, the controller 27 reads a token corresponds to the hash value calculated in step S104 from the storage device 25. This token is to be used to certify the first sending time. The process subsequently proceeds to step S110.

(Step S107) If it is determined in step S105 that no hash value identical to the calculated hash value is stored in the storage device 25, which means that the DR request received in step S101 is sent for the first time, the controller 27 causes the communicator 21 to send the hash value calculated in step S104 to the TSA 3.

(Step S108) Next, the communicator 21 receives a token from the TSA 3. This token is to be similarly used to certify the first sending time.

(Step S109) Next, the storage processor 24 associates the hash value calculated in step S104 with the token received in step S108 and stores them in the storage device 25. The process subsequently proceeds to step S110.

(Step S110) Next, the controller 27 sends the token acquired in step S106 or step S108 and the DR request received in step S101 to the receiving server 4. The process subsequently returns to step S101.

As described above, the transfer server 2 in the first embodiment includes the communicator 21 that receives the first demand response request and the second demand response request from the sending server 1. The transfer server 2 includes the creator 22 that creates the first request content information representing the contents of the first demand response request, from the first demand response request. The transfer server 2 includes the time-certification-information acquirer 23 that sends the first request content information to the TSA 3, and acquires the first time certification information that the TSA 3 sends in response to this sending, the first time certification information containing the time stamp that the TSA 3 has issued for the first demand response request. The transfer server 2 includes the storage processor 24 that performs a process of associating the first request content information with the first time certification information and storing them in the storage device 25. The transfer server 2 includes the determiner 26 that determines whether the second demand response request is the retransmission of the first demand response request, when the second demand response request is received by the communicator 21. The transfer server 2 includes the controller 27 that causes the communicator 21 to send the second demand response request and the first time certification information that is stored in the storage device 25, to the receiving server 4, if the determiner 26 determines that the DR request is a retransmitted one.

This allows the transfer server 2 to send, when receiving a retransmitted DR request, the first time certification information containing the time stamp that the TSA 3 has issued for the DR request of the first time, to the receiving server 4. Since the first time certification information is issued by the TSA 3, the time stamp of the trustworthy DR request of the first time can be provided to the receiving server 4 even when the DR request is retransmitted.

In addition, the creator 22 of the transfer server 2 in the present embodiment extracts the definition information from the received DR request, formats the extracted definition information, and calculates the hash value of the formatted definition information. This makes the hash value of the DR request in the first sending identical to the hash value of the DR request in retransmission, and thus comparing the hash values enables the determination of whether the received DR request is a retransmitted one.

Second Embodiment

Subsequently, a second embodiment will be described. The first embodiment is described by way of the example of the process of transmitting the time stamp that the TSA 3 has issued for the DR request for the first time. In contrast, a second embodiment will be described by way of an example of a process of transmitting a time stamp that the TSA 3 has issued for the DR request for the first time and the retransmitted DR request. Note that the configuration of the information system 10 in the second embodiment is the same as the configuration of the information processing system 10 in the first embodiment, and will not be described.

Figure 7:
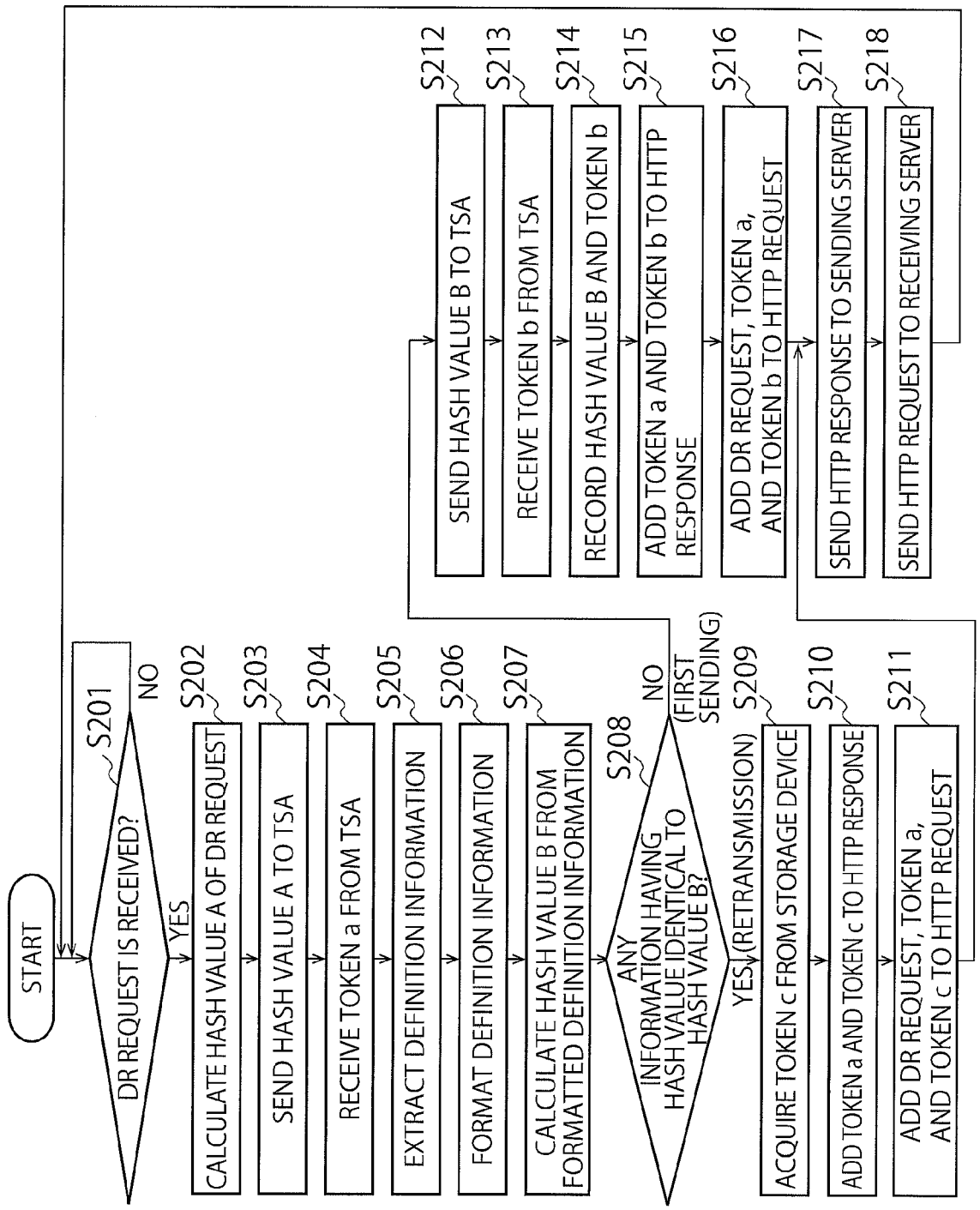
FIG. 7 is a flow chart showing an example of a process of transmitting a time stamp that a time-stamping authority 3 issues for the DR request for the first time and a retransmitted DR request.

Hereafter, each process will be described on the assumption that the servers cooperate with one another using the HTTP. First, the process in the transfer server 2 will be described with reference to FIG. 7. FIG. 7 is a flow chart showing an example of the process of transmitting the points in time that the TSA 3 has issued for the DR request in the first time and the DR request in retransmission.

(Step S201) The controller 27 determines whether the communicator 21 has received a DR request. For example, if the communicator 21 has received from the sending server 1 an HTTP request to which the DR request is added, the controller 27 determines that the communicator 21 has received the DR request.

(Step S202) If it is determined in step S201 that the communicator 21 has received the DR request, the hash value calculator 223 calculates a hash value A of this DR request. A "hash" (DR request) is thereby acquired in the form of the hash value A.

(Step S203) Next, the time-certification-information acquirer 23 sends the hash value A of the DR request to the TSA 3 to acquire a token a with respect to the hash value A of the DR request.

(Step S204) The time-certification-information acquirer 23 then acquires the token a from the TSA 3. This token a is denoted by "token" ("hash" (DR request), "ts" ("hash" (DR request))), and to be used to certify the retransmission time stamp of the DR request.

(Step S205) Next, the definition information extractor 221 extracts definition information from the DR request received by the communicator 21.

(Step S206) Next, the formatter 222 formats the extracted definition information. A "format" (DR request) is thereby created.

(Step S207) Next, the hash value calculator 223 calculates a hash value B from the formatted definition information. A "hash" ("format" (DR request)) is thereby acquired in the form of the hash value B.

(Step S208) Next, the determiner 26 determines whether any information having a hash value identical to the hash value B is stored in the storage device 25. For example, the determiner 26 determine whether any information whose three items being a sending server ID, a receiving server ID, and a hash value B match those of the DR request is stored in the storage device 25. If this information is stored in the storage device 25, the DR request is a retransmitted one, or if this information is not stored in the storage device 25, the DR request is sent for the first time. Here, the DR sending server ID and the DR receiving server ID used therefor may be the respective IDs specified in the DR request, or may be an IP address or a URL of the HTTP.

(Step S209) If it is determined in step S208 that any information having a hash value identical to the hash value B is stored in the storage device 25, which means the DR request is a retransmitted one, the controller 27 reads a token c corresponding to this hash value B from the storage device 25. The process subsequently proceeds to step S210. This token c is the token that is acquired and stored in the storage device 25 when the DR request is received at the first time, and is to be used to certify the first sending time.

(Step S210) Next, the token adder 271 adds the token a and the token c to an HTTP response. Note that the token adder 271 adds the token a and the token c in such a manner that they can be distinguished from each other. For example, when adding them to the header field, the token adder 271 gives them different header field names, as shown in FIG. 8.

Figure 8:
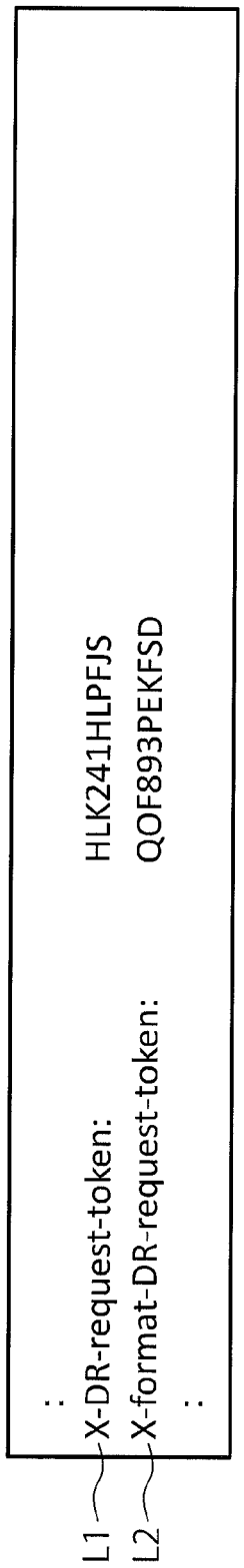
FIG. 8 is an example of a token added to an HTTP header field.

FIG. 8 is an example of the tokens added to an HTTP header field. A line L1 in FIG. 8 shows the field name of the token a: X-DR-request-token, and the value of the token a: HLK241HLPFJS. In addition, the next line L2 shows the field name of the token c: X-format-DR-request-token, and the value of the token c: QOF893PEKFSD.

(Step S211) Next, the token adder 271 adds the DR request, the token a, and the token c to an HTTP request to be transferred. The location of the addition may be the HTTP header field or an HTTP body. Note that the token adder 271 adds the token a and the token c in such a manner that they can be distinguished from each other.

(Step S212) If it is determined in step S208 that the information having the hash value identical to the hash value B is not stored in the storage device 25, which means that the DR request is sent for the first time, the controller 27 causes the communicator 21 to send the hash value B to the TSA 3.

(Step S213) Next, the communicator 21 receives a token b that the TSA 3 has sent in response to the sending of the hash B in step S212. This token b is denoted by "token" ("hash" ("format" (DR request)), "ts" ("hash" ("format" (DR request)))).

(Step S214) Next, the storage processor 24 associates the hash value B calculated in step S207 with the token b acquired from the TSA 3 and records them in the storage device 25. The storage processor 24 also records the sending server ID and the receiving server ID together in the storage device 25. This allows the token b to be read from storage device 25 using the hash value B in the retransmission of the DR request.

(Step S215) Next, the token adder 271 adds the token a and the token b to the HTTP response. The location of the addition may be the HTTP header field or the HTTP body. Note that the token adder 271 adds the token a and the token b in such a manner that they can be distinguished from each other. For example, when adding them to the header field, the token adder 271 gives them different header field names, as shown in FIG. 8.

(Step S216) Next, the token adder 271 adds the DR request, the token a, and the token b to the HTTP request to be transferred. The location of the addition may be the HTTP header field or the HTTP body. Note that the token adder 271 adds the token a and the token b in such a manner that they can be distinguished from each other.

(Step S217) Next, the communicator 21 sends the HTTP response to which the token is added to the sending server 1.

(Step S218) Next, the communicator 21 sends the HTTP request to be transferred to the receiving server 4.

As seen from the above, when receiving the retransmitted DR request, the transfer server 2 acquires token a that the TSA 3 has issued for this received DR request, and acquires the token c that the TSA 3 has issued in the first sending of the DR request. Here, the token a contains a retransmission time stamp that the TSA 3 has issued, and the token c contains the first sending time that the TSA 3 has issued. The transfer server 2 then sends the acquired token a and token c to the sending server 1 and the receiving server 4. This allows the sending server 1 and the receiving server 4 to acquire the first sending time and the retransmission time stamp that the TSA 3 has issued.

Figure 9:
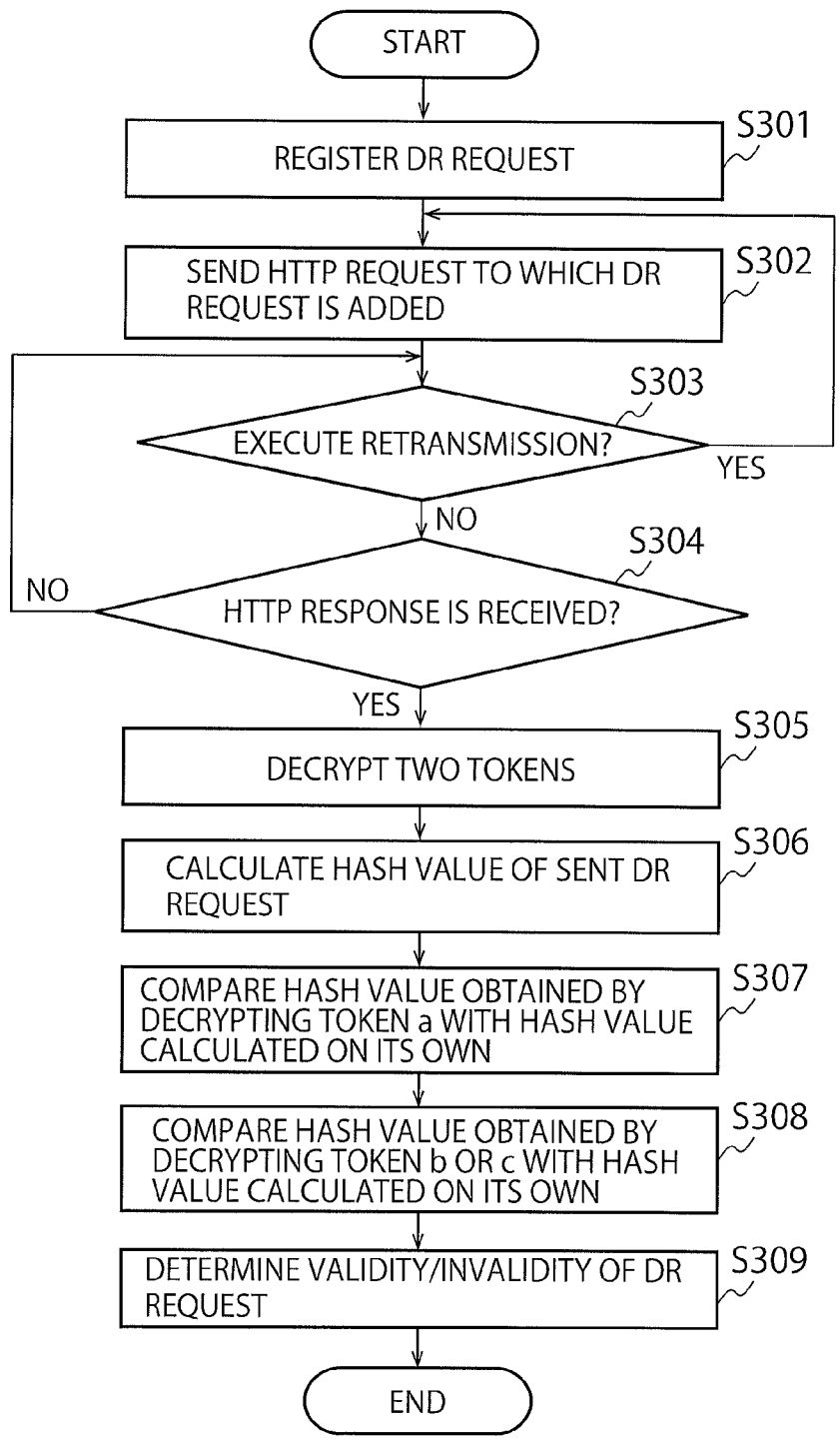
FIG. 9 is a flow chart showing an example of a process in which a sending server 1 sends a DR request.

Subsequently, a process in which the sending server 1 sends a DR request will be described with reference to FIG. 9. FIG. 9 is a flow chart showing an example of the process in which the sending server 1 sends the DR request.

(Step S301) First, the sending server 1 registers a DR request. More specifically, the DR request storage 12 stores a DR request to be registered. A method of registering the DR request includes one in which an operator instructs the sending server 1 to register the DR request, and one in which a program in the sending server 1 automatically registers the DR request.

(Step S302) When the DR request is registered in step S301, the controller 16 adds the DR request recorded in the DR request storage 12 to an HTTP request. The location of the addition may be a header field or a body field in the HTTP request. The communicator 11 then sends the HTTP request to which the DR request is added to the transfer server 2.

(Step S303) Next, the retransmitter 13 determines whether to execute the retransmission. If the retransmitter 13 determines the retransmission execution, the process returns to the step S302, where the HTTP request to which the DR request is added is retransmitted.

(Step S304) If it is determines in step S303 that the retransmitter 13 does not execute the retransmission, the sending time confirmor 15 determines whether the communicator 11 has received a HTTP response that the transfer server 2 sends as a response. To the HTTP response, the above-described token a and token b or c are added. If the communicator 11 has not received the HTTP response send by the transfer server 2 as a response, the process returns to step S303, where the retransmitter 13 determines again whether to execute the retransmission.

(Step S305) If the communicator 11 has received the HTTP response send by the transfer server 2 as a response in step S304, the sending time confirmor 15 decrypts the above-described token a and token b or c using the public key distributed from the TSA 3 in advance. The sending time confirmor 15 acquires as a result a set ["hash" (DR request), "ts" ("hash" (DR request))] from the token a. In addition, the sending time confirmor 15 acquires a set ["hash" ("format" (DR request)), "ts" ("hash" ("format" (DR request)))] from the token b or c. If the decryption fails, which means that the above-described tokens may not be the tokens issued by the TSA 3, the subsequent process is not performed.

(Step S306) Next, the creator 14 calculates a hash value of the DR request that has been sent in step S302. More specifically, the creator 14 calculates the hash value "hash" (DR request) of the DR request, formats definition information contained in the DR information, and calculates the hash value "hash" ("format" (DR request)) of the formatted definition information. For the calculation of the hash values, the definition information extractor 141, the formatter 142, and the hash value calculator 143 are utilized.

(Step S307) Next, the sending time confirmor 15 compares the hash value "hash" (DR request) obtained by decrypting the token a with a hash value "hash" (DR request) that the sending time confirmor 15 calculates on its own. If the values match, the sending time confirmor 15 acquires a time stamp "ts" ("hash" (DR request)) obtained by decrypting the token a as a retransmission time stamp of the DR request. That is, the match certifies that the DR request is retransmitted at the time stamp represented by this time stamp "ts" ("hash" (DR request)). If the values do not match, which means that the time stamp "ts" ("hash" (DR request)) cannot be trusted, the subsequent process is not performed.

(Step S308) Next, the sending time confirmor 15 compares the hash value "hash" ("format" (DR request)) obtained by decrypting the token b or c with a hash value "hash" ("format" (DR request)) that the sending time confirmor 15 calculates on its own. If the values match, the sending time confirmor 15 acquires the time stamp "ts" ("hash" ("format" (DR request))) obtained by decrypting the token b or c as the first sending time of the DR request. That is, the match certifies that the DR request in the first time is transmitted at a time stamp represented by this time stamp "ts" ("hash" ("format" (DR request))). If the values do not match, which means that the time stamp "ts" ("hash" ("format" (DR request))) cannot be trusted, the subsequent process is not performed.

(Step S309) Next, sending time confirmor 15 determines the validity/invalidity of the DR request based on the acquired retransmission time stamp, the acquired first sending time, and the DR contract. If the DR request is determined to be invalid, the sending time confirmor 15 may notify the determination of the invalidity to the operator by mail or the like.

As seen from the above, even when a DR request is to be retransmitted, the sending server 1 can acquire the first sending time of the DR request. In addition, the sending server 1 can also acquire the retransmission time stamp of the DR request. The sending time confirmor 15 can then determine the validity/invalidity of the DR request using the acquired retransmission time stamp and the acquired first sending time.

Figure 10:
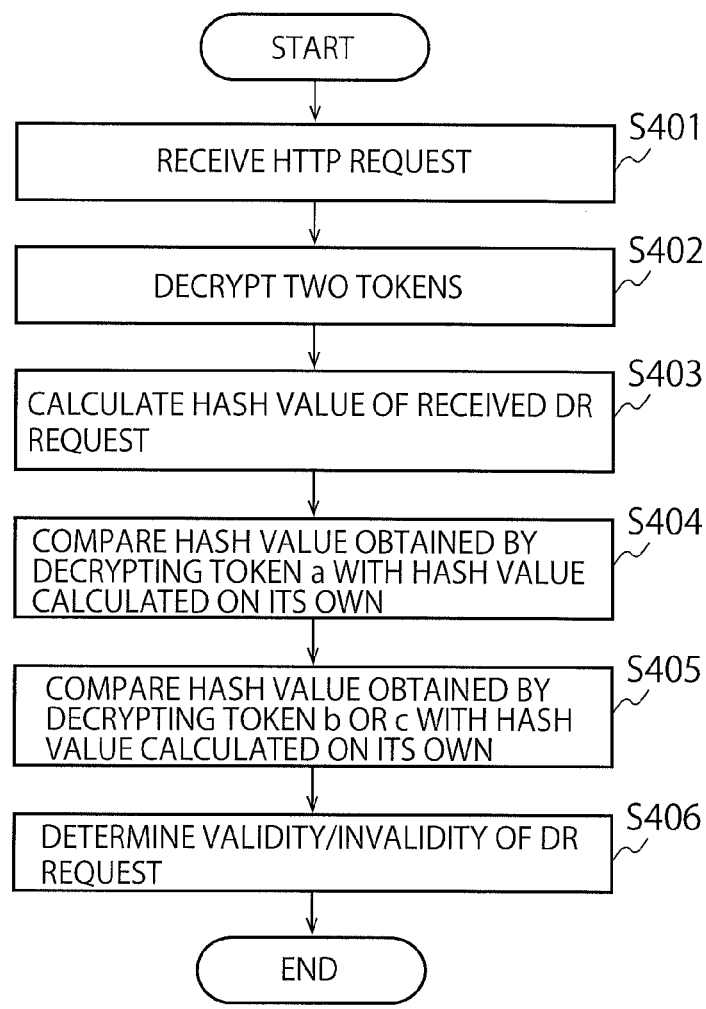
FIG. 10 is a flow chart showing an example of a process in which a receiving server 4 receives a DR request.

Subsequently, a process in which the receiving server 4 receives a DR request will be described with reference to FIG. 10. FIG. 10 is a flow chart showing an example of the process in which the receiving server 4 receives the DR request.

(Step S401) First, the communicator 41 receives an HTTP request. To the HTTP request, the above-described DR request, and the token a and the token b or c are added.

(Step S402) Next, as with step S305 in FIG. 9, the sending time confirmor 44 decrypts the above-described the token a and the token b or c using the public key distributed from the TSA 3 in advance. The sending time confirmor 44 acquires as a result a set ["hash" (DR request), "ts" ("hash" (DR request))] from the token a. In addition, the sending time confirmor 44 acquires a set ["hash" ("format" (DR request)), "ts" ("hash" ("format" (DR request)))] from the token b or c. If the decryption fails, which means that the tokens may not be tokens issued by the TSA 3, the subsequent process is not performed.

(Step S403) Next, as with step S306 in FIG. 9, the creator 43 calculates a hash value of the DR request that has been received in step S401. More specifically, the creator 43 calculates the hash value "hash" (DR request) of the DR request, and formats definition information contained in the DR information, and calculates the hash value "hash" ("format" (DR request)) of the formatted definition information. For the calculation of the hash value, the definition information extractor 431, the formatter 432, and the hash value calculator 433 are utilized.

(Step S404) Next, as with step S307 in FIG. 9, the sending time confirmor 44 compares the hash value "hash" (DR request) obtained by decrypting the token a and the hash value "hash" (DR request) that the sending time confirmor 44 calculates on its own. If the values match, the sending time confirmor 44 acquires a time stamp "ts" ("hash" (DR request)) obtained by decrypting the token a as the retransmission time stamp of the DR request. That is, the match certifies that the DR request is retransmitted at the time stamp represented by this time stamp "ts" ("hash" (DR request)). If the values do not match, which means that the time stamp "ts" ("hash" (DR request)) cannot be trusted, the subsequent process is not performed.

(Step S405) Next, as with step S308 in FIG. 9, the sending time confirmor 44 compares the hash value "hash" ("format" (DR request)) obtained by decrypting the token b or c with a hash value "hash" ("format" (DR request)) that the sending time confirmor 44 calculates on its own. If the values match, the sending time confirmor 44 acquires the time stamp "ts" ("hash" ("format" (DR request))) obtained by decrypting the token b as the first sending time of the DR request. That is, the match certifies that the DR request for the first time is sent at a time stamp represented by this time stamp "ts" ("hash" ("format" (DR request))). If the values do not match, which means that the time stamp "ts" ("hash" ("format" (DR request))) cannot be trusted, the subsequent process is not performed.

(Step S406) Next, the sending time confirmor 44 determines the validity/invalidity of the DR request based on the acquired retransmission time stamp, the acquired first sending time, and the DR contract. If the DR request is determined to be valid, the control performer 42 performs a process of reducing electric energy consumption such as stopping devices (e.g., an air conditioner) during a DR target period. If the DR request is determined to be invalid, the control performer 42 may perform no device control.

As seen from the above, even when the DR request is retransmitted, the receiving server 4 can acquire the first sending time of the DR request. In addition, the receiving server 4 can also acquire the retransmission time stamp of the DR request. The sending time confirmor 44 can then determine the validity/invalidity of the DR request using the acquired retransmission time stamp and the acquired first sending time. If the DR request is determined to be valid, the control performer 42 performs the process of reducing the electric energy consumption during the DR target period. As a result, even when the DR request is retransmitted, it is possible to reduce the electric energy consumption in response to the demand response request, as long as the DR request is valid.

Figure 11:
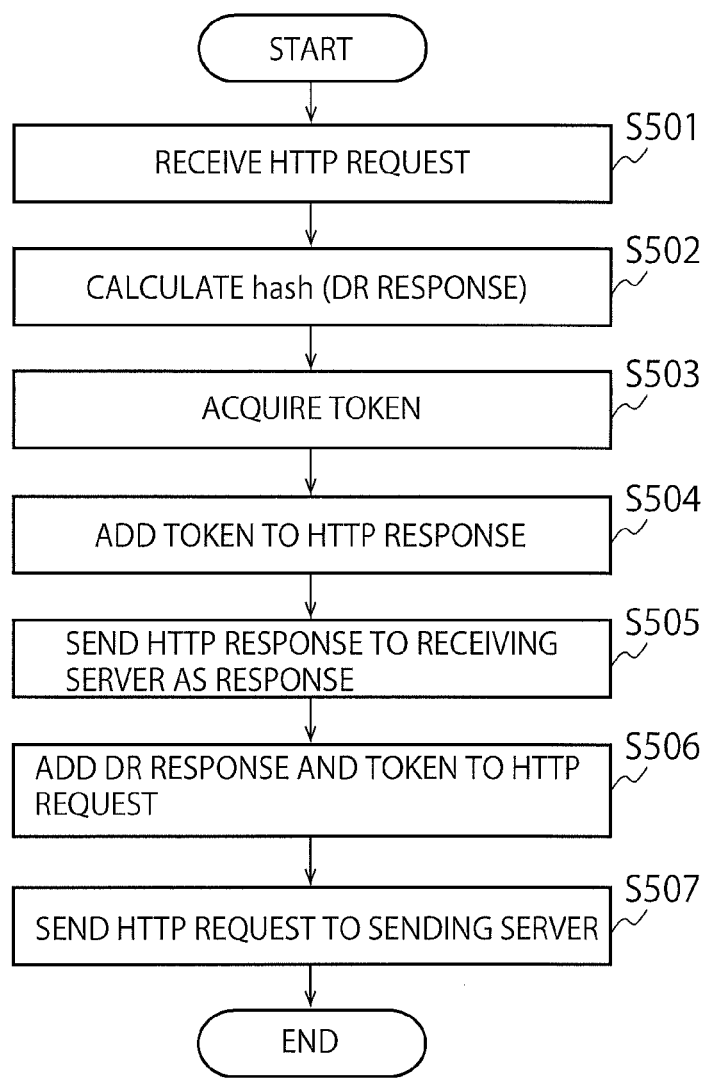
FIG. 11 is a flow chart showing an example of the flow of a process in which a transfer server 2 transfers a DR response.

Some DR protocols may cause the receiving server 4 that receives a DR request from the transfer server 2 to send DR response as a response to the sending server 1 via the transfer server 2. Some DR contracts makes a sending time of the DR response (hereafter, referred to as a DR response sending time) used to determine the validity/invalidity of the DR request. Thus, there may be cases where certifying the DR response sending time is important. There will be described below with reference to FIG. 11 the flow of a process of transferring the DR response together with a token containing a time stamp that the TSA 3 has issued for the DR response. FIG. 11 is a flow chart showing an example of the flow of a process in which the transfer server 2 transfers the DR response. Note that the process in FIG. 11 is a process performed after the transfer server 2 sends the DR request to the receiving server 4 in step S110 in FIG. 6.

(Step S501) First, the communicator 21 receives an HTTP request from the receiving server 4. To the HTTP request, a DR response for a DR request is added.

(Step S502) Next, the hash value calculator 223 calculates a hash value "hash" (DR response) of this DR response.

(Step S503) Next, the time-certification-information acquirer 23 causes the communicator 21 to send the hash value "hash" (DR response) calculated in step S502 to the TSA 3, and acquires a token "token" ("hash" (DR response), "ts" ("hash" (DR response))) from the TSA 3 through communication. Here, the token "token" ("hash" (DR response), "ts" ("hash" (DR response))) is obtained by encrypting the hash value "hash" (DR response) and the time stamp "ts" ("hash" (DR response)) using the private key. In addition, the time stamp "ts" ("hash" (DR response)) is a time stamp issued by the TSA 3, representing the DR response sending time.

(Step S504) Next, the token adder 271 adds the token "token" ("hash" (DR response), "ts" ("hash" (DR response))) acquired in step S503 to an HTTP response.

(Step S505) Next, the communicator 21 sends the HTTP response to the receiving server 4 as a response. The receiving server 4 can acquire the DR response sending time by decrypting the token added to the HTTP response using the public key distributed from the TSA 3 in advance.

(Step S506) Next, the token adder 271 adds the DR response, and the token "token" ("hash" (DR response), "ts" ("hash" (DR response))) to an HTTP request to be transferred.

(Step S507) Next, the communicator 21 sends the HTTP request to be transferred to the sending server 1. The sending server 1 can confirm the DR response sending time by decrypting the token "token" ("hash" (DR response), "ts" ("hash" (DR response))) added to the HTTP request using the public key distributed by the TSA 3 in advance.

As seen from the above, when receiving the DR response, the transfer server 2 acquires from the TSA 3 the token containing the DR response sending time issued by the TSA 3, and send the acquired token to the sending server 1 and the receiving server 4. This allows the transfer server 2 to provide trustworthy DR response sending time to the sending server 1 and the receiving server 4.

As described above, in the transfer server 2 in the second embodiment, when the second demand response request is received by the communicator 21, the creator 22 extracts the second request content information (e.g., the second hash value) that represents the contents of the second demand response request from the second demand response request. The time-certification-information acquirer 23 then causes the communicator 21 to send a signal containing the second request content information (e.g., the second hash value) to the TSA 3, and acquires from the TSA 3 the second time certification information (e.g., the token a) containing the time stamp that the TSA 3 has issued for the second demand response request. If the determiner 26 then determines the DR request is a retransmitted one, the controller 27 causes the communicator 21 to send, in addition to the first time certification information (e.g., the token c), the second time certification information (e.g., the token a) to the sending server 1.

This allows the transfer server 2, when receiving the retransmitted DR request, to send the first time certification information containing the time stamp that the TSA 3 has issued for the DR request at the first time, and second time certification information containing the time stamp that the TSA 3 has issued for this retransmitted DR request, to the receiving server 4. Since the first time certification information and the second time certification information are issued by the TSA 3, the trustworthy first sending time and the trustworthy retransmission time stamp of the DR request can be provided to the receiving server 4 even when the DR request is retransmitted.

In the present embodiment, the method in which the transfer server 2 adds a token to an HTTP request or an HTTP response, but is not limited to this. The method may be one in which the sending server 1 or the receiving server 4 requests a token from the transfer server 2 as needed. For example, the method of requesting a token from the transfer server 2 can be readily implemented by causing the transfer server 2 to operate a Web server and publish the token on the Web server.

In addition, if the transfer of the DR request or the DR response fails, the transfer server 2 may retry the transfer. In addition, if the transfer fails, the transfer server 2 may notify the failure of the transfer to the sending server 1 or the receiving server 4.

Third Embodiment

Subsequently, a third embodiment will be described. In the first embodiment and second embodiment, the transfer server 2 stores the token issued by the TSA 3. In contrast, in a third embodiment it is different from the first embodiment and the second embodiment in that the sending server 1 stores the token issued by the TSA 3.

Figure 12:
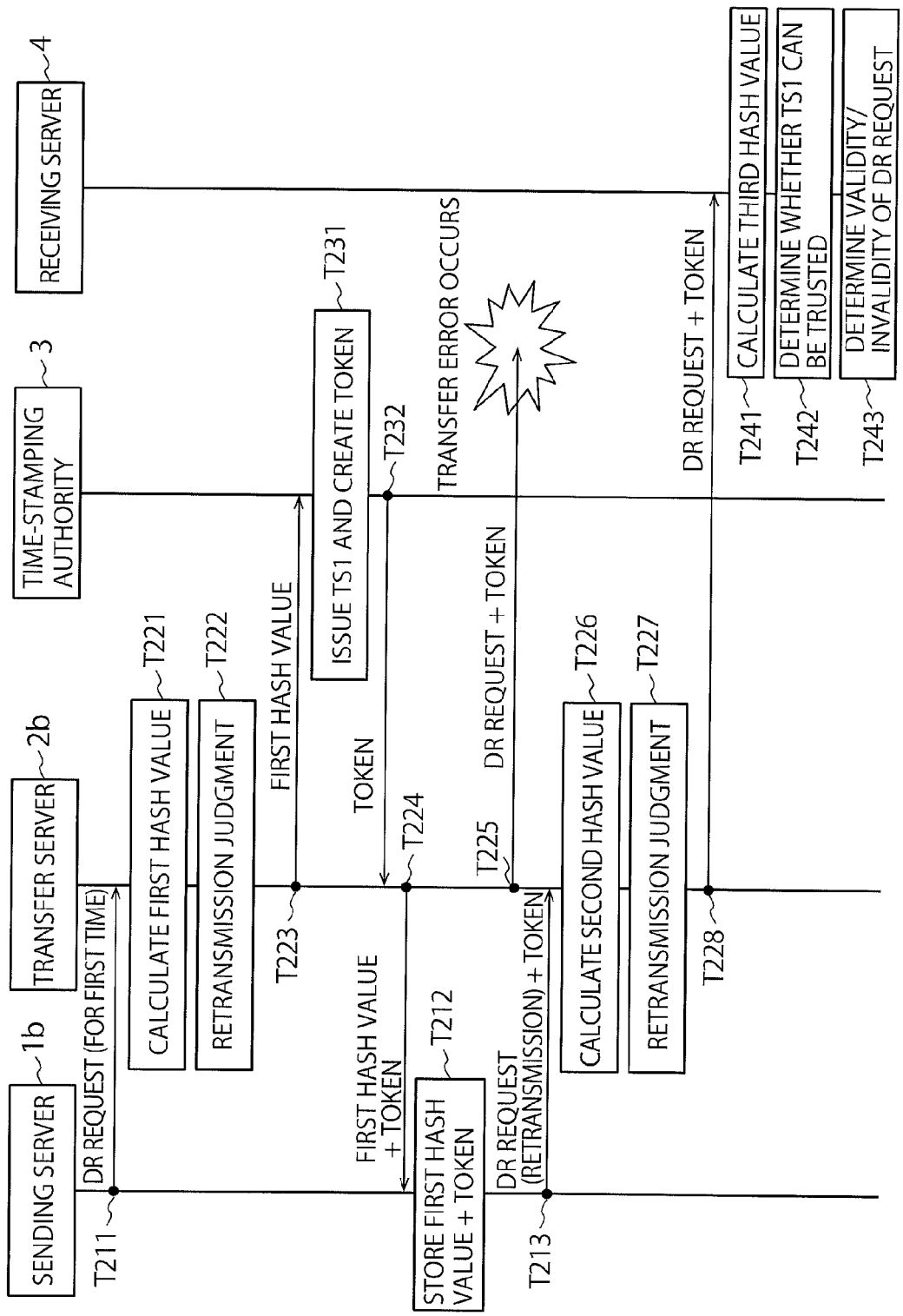
FIG. 12 is a sequence diagram showing an example of a process of transferring a DR request in a third embodiment.

First, the outline of a process of transferring a DR request in the third embodiment will be described with reference to FIG. 12. FIG. 12 is a sequence diagram showing an example of process of transferring a DR request in the third embodiment.

The process of T211 is the same as the process of T11 in FIG. 2, and will not be described. The process of T221 is the same as the process of T21 in FIG. 2, and will not be described.

(T222) A transfer server 2*b* determines whether a DR request sent in T211 is a retransmitted one. More specifically, the transfer server 2*b* determines whether the DR request is a retransmitted one by determining whether having received a token together with the DR request. Here, the token has not been received together with the DR request, and the DR request is thus determined not to be a retransmitted one, that is, to be sent for the first time.

The process of T223 is the same as the process of T23 in FIG. 2, and will not be described. The process of T231 to T232 is the same as the process of T31 to T32 in FIG. 2, and will not be described.

(T224) The transfer server 2*b* sends the first hash value calculated in T221 and the token acquired from the TSA 3 to a sending server 1*b*.

(T212) Next, the sending server 1*b* associates the first hash value received from the transfer server 2*b* with the token, and stores them.

(T225) Next, the transfer server 2*b* sends the DR request and the token towards the receiving server 4. Assume the case where a fault (transfer error) however occurs in the middle of this sending.

(T213) Next, when detecting the occurrence of the transfer error, the sending server 1*b* retransmits the DR request to the transfer server 2*b*. At the time of the retransmission, the sending server 1*b* sends the token together to the transfer server 2*b*.

(T226) Next, the transfer server 2*b* extracts, from the retransmitted DR request, definition information to define this DR request, formats this definition information so as to match a predetermined format, and calculates a second hash value, which is a hash value of the formatted definition information.

(T227) Next, the transfer server 2*b* determines whether the DR request sent in T213 is a retransmitted one. More specifically, the transfer server 2*b* determines whether the DR request is a retransmitted one by determining whether the token has been received together with the DR request. Here, the token has been received together with the DR request, and thus the DR request is determined to be a retransmitted one.

The process of T228 is the same as the process of T29 in FIG. 2, and will not be described. The process of T241 to T243 is the same as the process of T41 to T43 in FIG. 2, and will not be described.

Figure 13:
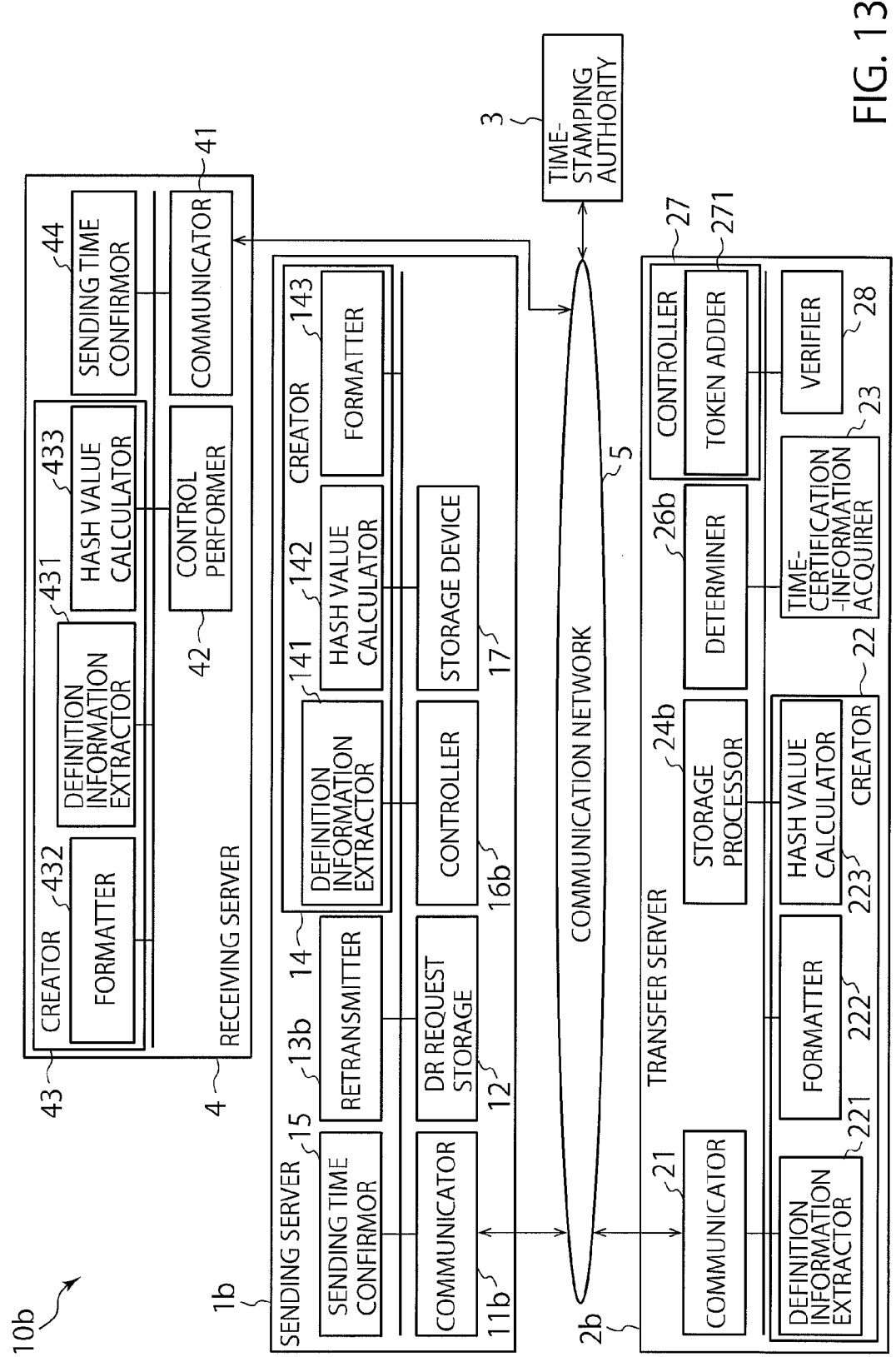
FIG. 13 is a schematic block diagram showing the configuration of an information processing system 10b in the third embodiment.

FIG. 13 is a schematic block diagram showing the configuration of an information processing system 10*b* in the third embodiment. Note that, in FIG. 13, components common to those in FIG. 3 will be denoted by the same reference numerals, and the specific description thereof will not be made. The configuration of the information processing system 10*b* in the third embodiment is different from the configuration of the information processing system 10 in the first embodiment in that the sending server 1 is changed to the sending server 1*b* and the transfer server 2 is changed to the transfer server 2*b*.

Configuration of Sending Server 1*b*

Subsequently, the configuration of the sending server 1*b* will be described.

The sending server 1*b* is different from the sending server 1 in the first embodiment in that the sending server 1*b* further includes a storage device 17, the communicator 11 is changed to a communicator 11*b*, the retransmitter 13 is changed to a retransmitter 13*b*, and the controller 16 is changed to a controller 16*b*.

The communicator 11*b* has functions similar to that of the communicator 11 in the first embodiment, and further has the following functions. The communicator 11*b* sends a demand response request to a first communication device, and acquires from the transfer server 2*b* time certification information (e.g., a token) containing a time stamp that the TSA 3 has issued for this demand response request in response to this sending.

The controller 16*b* has functions similar to those of the controller 16 in the first embodiment, and further has the following functions. The controller 16*b* causes the storage device 17 to store the time certification information (e.g., the token) received by the communicator 11*b*.

The retransmitter 13*b* has functions similar to those of the retransmitter 13 in the first embodiment, but is different in the following points. The retransmitter 13*b*, when determining to execute the retransmission of the demand response request, reads the time certification information stored in the storage device 17, and causes the communicator 11*b* to send the read time certification information to the transfer server 2*b* together with the demand response request.

The transfer server 2*b* is different from the transfer server 2 in the first embodiment in that the transfer server 2*b* does not include the storage device 25 but further includes a verifier 28, the storage processor 24 is changed to a storage processor 24*b*, and the determiner 26 is changed to a determiner 26*b*.

The storage processor 24*b*, when the first demand response request is received by the communicator 21, sends first request content information (e.g., a hash value) and first time certification information (e.g., a token) to the sending server 1*b* such that the sending server 1*b* associates the first request content information with the first time certification information and causes the storage device 17 to store them.

The determiner 26*b* determines whether the second demand response request is the retransmission of the first demand response request by determining whether the first time certification information is added to the second demand response request received by the communicator 21.

When the first time certification information is added to the second demand response request, the controller 27 causes the communicator 21 to send the added first time certification information to the receiving server 4. In contrast, when the first time certification information is not added to the second demand response request, the controller 27 causes the communicator 21 to send second time certification information containing a time stamp that the TSA 3 has issued for the second demand response request, to the receiving server 4. Here, the second time certification information is acquired from the TSA that sends it in response to the time-certification-information acquirer 23 sending the second request content information (e.g., the second hash value) to the TSA 3.

The creator 22, when the second demand response request is received by the communicator 21, extracts second request content information representing the contents of the second demand response request (e.g., the second hash value), from the second demand response request.

The verifier 28 verifies whether the first time certification information (e.g., a token) acquired from the sending server 1b is correct. For example, the verifier 28 verifies whether the first time certification information is correct using the first time certification information added to the received second demand response request and second request content information (e.g., the second hash value). More specifically, for example, the verifier 28 decrypts this first time certification information using the public key distributed from TSA 3 in advance, and verifies whether the first time certification information is correct by comparing the decrypted value and the second request content information (e.g., the second hash value).

Figure 14:
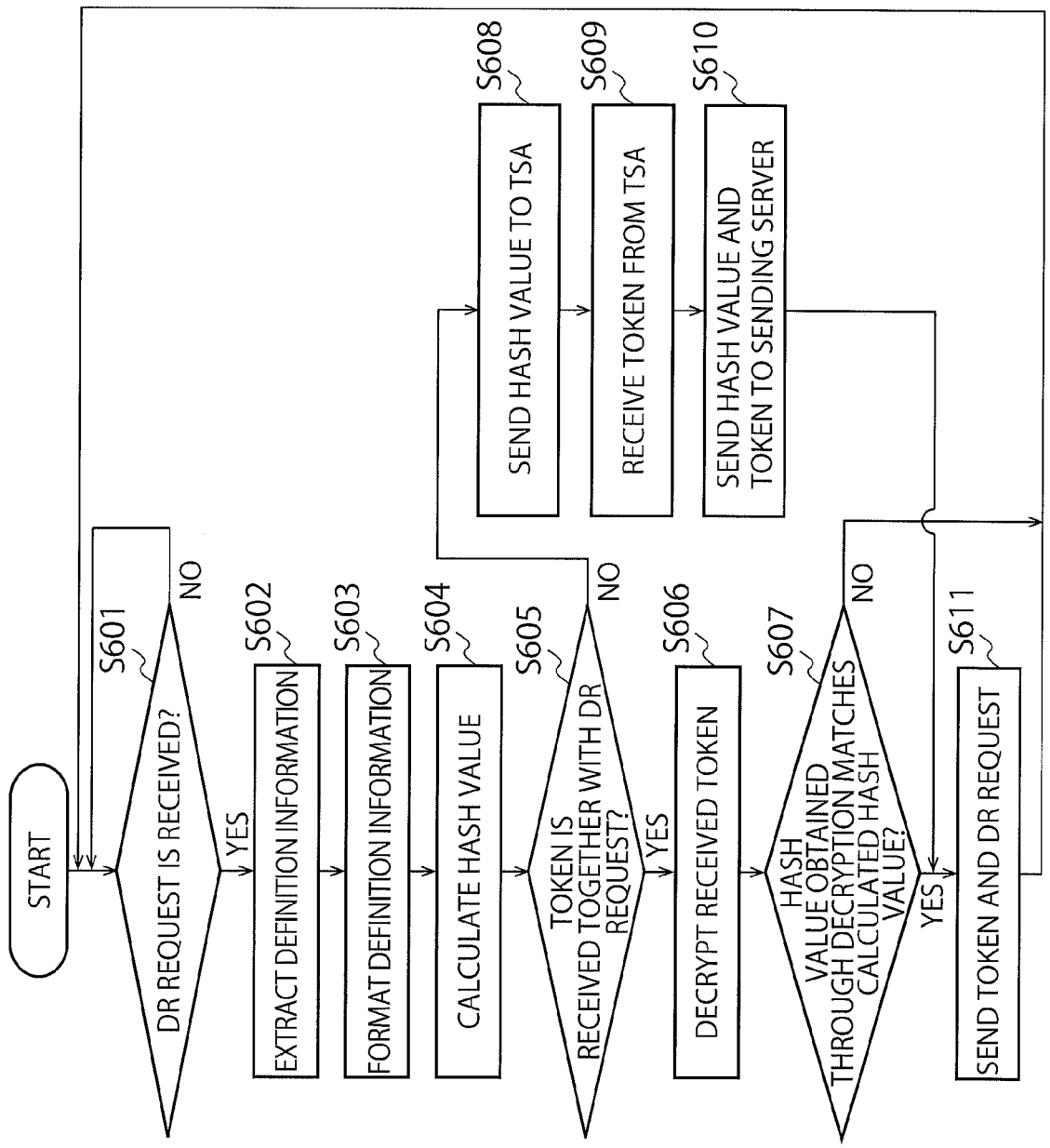
FIG. 14 is a flow chart showing an example of a process of certifying the first sending time of a DR request.

Subsequently, a process of certifying the first sending time of a DR request will be described with reference to FIG. 14. FIG. 14 is a flow chart showing an example of the process of certifying the first sending time of the DR request. Steps S601 to S604 are the same as steps S101 to S104 in FIG. 6, and will not be described.

(Step S605) The determiner 26b determines whether a token has been received together with the DR request.

(Step S606) If it is determined in step S605 that the token has been received together with the DR request, the verifier 28 decrypts the received token using the public key distributed from TSA 3 in advance.

(Step S607) Next, the verifier 28 determines whether the hash value obtained through the decryption matches the hash value calculated in step S604. If the hash value obtained through the decryption does not match the hash value calculated in step S604, the process returns to step S601. If the hash value obtained through the decryption matches the hash value calculated in step S604, the process proceeds to step S611.

(Step S608) If it is determined in step S605 that the token has not been received together with the DR request, the communicator 21 sends the hash value calculated in step S604 to the TSA 3. This causes the TSA 3 to issue a time stamp, and create a token obtained by encrypting the issued time stamp and this hash value using the private key.

(Step S609) Next, the communicator 21 receives the token from the TSA 3.

(Step S610) Next, the communicator 21 sends the hash value calculated in step S604 and the token received from the TSA 3 in step S608, to the sending server 1b. The process subsequently proceeds to step S611.

(Step S611) Next, the communicator 21 sends the token acquired from the sending server 1b or the TSA 3 and the DR request received in step S601, to the receiving server 4. The process subsequently returns to step S101.

As seen from the above, the determiner 26b determines whether the token has been received together with the DR request. If it is determined that a token has been received together with the DR request, which means that the received DR request is a retransmitted one, the communicator 21 sends this token and the DR request to the receiving server 4. In contrast, if it is determined that no token has not been received together with the DR request, which means that the received DR request is sent for the first time, the communicator 21 acquires a token from the TSA 3. The communicator 21 sends this token and the DR request to the receiving server 4.

The token thereby contains a time stamp that the TSA 3 has issued for the DR request for the first time, which allows the transfer server 2b to provide the trustworthy first sending time to the receiving server 4.

As described above, in the transfer server 2b in the third embodiment, the storage processor 24b, when the first demand response request is received by the communicator 21, sends the first request content information and the first time certification information to the sending server 1b such that the first communication device associates the first request content information with the first time certification information and causes the storage device 17 to store them. The determiner 26b determines whether the second demand response request is the retransmission of the first demand response request by causing the communicator 21 to determine whether the first time certification information is added to the received second demand response request. If the first time certification information is added to the second demand response request, the controller 27 causes the communicator 21 to send the added first time certification information to the receiving server 4.

This allows the transfer server 2b, when receiving the retransmitted DR request, to send the first time certification information containing the time stamp that the TSA 3 has issued for the DR request for the first time, to the receiving server 4. The first time certification information is issued by the TSA 3, and it is thus possible to provide the trustworthy first sending time of the DR request to the receiving server 4, even when the DR request is retransmitted.

Fourth Embodiment

Subsequently, a fourth embodiment will be described. The third embodiment is described by way of the example of the process of certifying only the first sending time of the DR request. In contrast, the fourth embodiment will be described by way of an example of a process of certifying both the first sending time and the retransmission time stamp of the DR request.

Note that the configuration of an information system 10b in the fourth embodiment is the same as the configuration of the information processing system 10b in the third embodiment, and will not be described.

Figure 15:
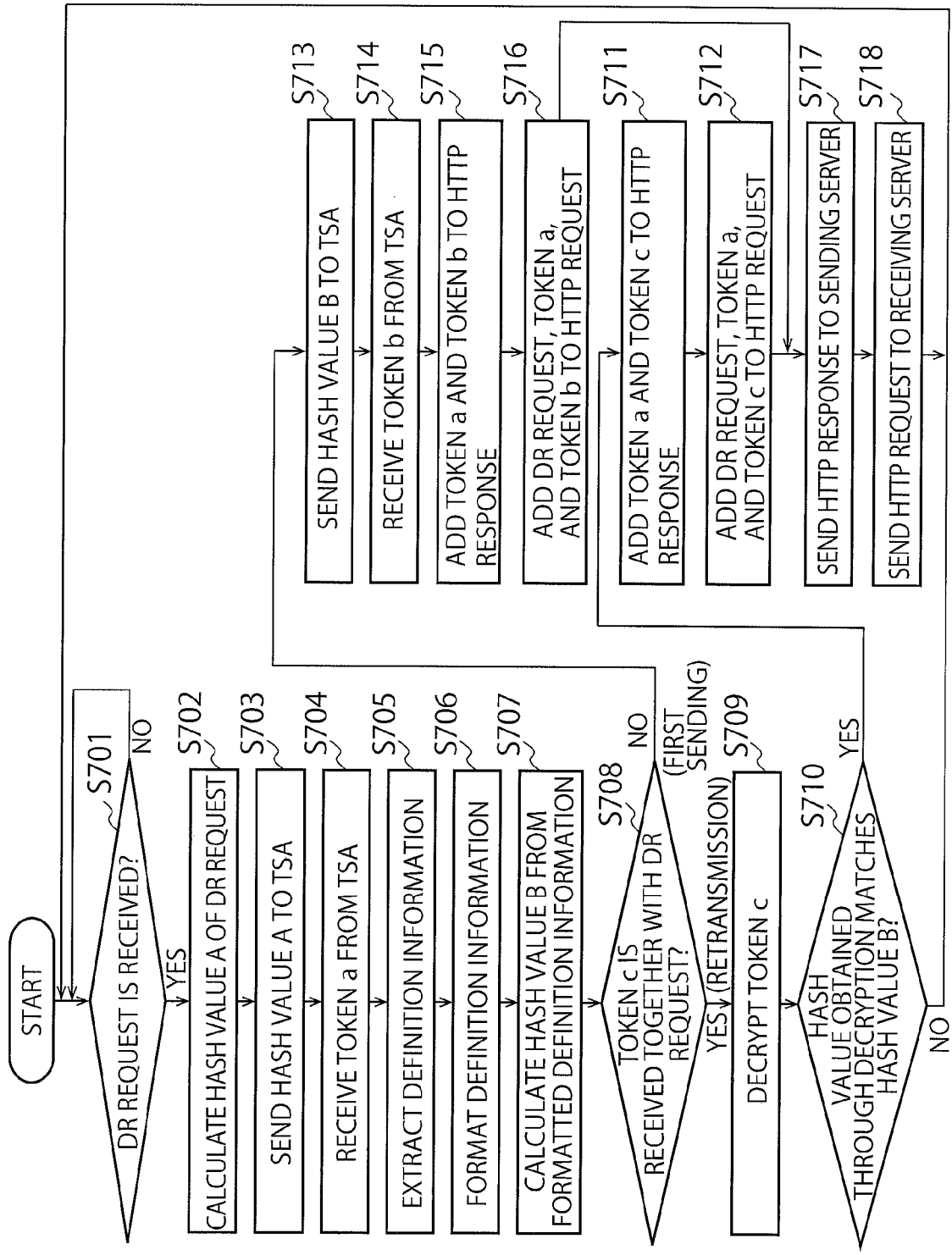
FIG. 15 is a flow chart showing an example of a process of certify both the first sending time and the retransmission sending time of a DR request.

First, the process in the transfer server 2b will be described with reference to FIG. 15. FIG. 15 is a flow chart showing an example of a process in the fourth embodiment of certifying both the first sending time and the retransmission sending time of the DR request. The process of steps S701 to S707 is the same as the process of steps S201 to S207 in FIG. 7, and will not be described.

(Step S708) Next, the determiner 26b determines whether the token c has been received together with the DR request.

(Step S709) If it is determined in step S708 that the token c has been received together with the DR request, which means that the DR request is a retransmitted one, the verifier 28 decrypts the received token c using the public key distributed from TSA 3 in advance.

(Step S710) The verifier 28 determines whether the hash value obtained through the decryption matches the hash value B calculated in step S707. If it is determined that the hash value obtained through the decryption does not match the hash value B calculated in step S707, the process returns to step S701.

(Step S711) If it is determined in step S710 that the hash value obtained through the decryption matches the hash value B calculated in step S707, which means that the DR request is a retransmitted one, the token adder 271 adds a token a and a token c to an HTTP response. Note that the location of the addition may be a HTTP header field or a HTTP body. The addition may be performed such that the two token can be distinguished from each other.

(Step S712) Next, the token adder 271 adds the DR request, the token a, and the token c to the HTTP request. The process subsequently proceeds to step S717. Note that the location of the addition may be a HTTP header field or a HTTP body. The addition may be performed such that the two token can be distinguished from each other.

(Step S713) If it is determined in step S708 that the token c has not been received together with the DR request, which means that the DR request is sent for the first time, the controller 27 causes the communicator 21 to send the hash value B to the TSA 3.

(Step S714) Next, the communicator 21 receives the token b that the TSA 3 has sent in response to the sending of the hash B in step S210. This token b is denoted by "token" ("hash" ("format" (DR request)), "ts" ("hash" ("format" (DR request)))).

(Step S715) Next, the token adder 271 adds the token a and the token b to the HTTP response. Note that the location of the addition may be the HTTP header field or the HTTP body. The addition may be performed such that the two tokens can be distinguished from each other.

(Step S716) Next, the token adder 271 adds the DR request, the token a, and the token b to the HTTP request. Note that the location of the addition may be the HTTP header field or the HTTP body. The addition may be performed such that the two tokens can be distinguished from each other.

The process of steps S717 and S718 is the same as the process of steps S217 and S218 in FIG. 7, and will not be described.

As seen from the above, the transfer server 2b, when receiving the retransmitted DR request, acquires the token a that the TSA 3 has issued for this received DR request, and acquires the token c that the TSA 3 has issued in the first sending of the DR request. Here, the token a contains the retransmission time stamp issued by the TSA 3, and the token c contains the first sending time issued by the TSA 3. The transfer server 2b then sends the acquired token a and token c to the sending server 1b and the receiving server 4. This allows the sending server 1b and the receiving server 4 to acquire the first sending time and the retransmission time stamp issued by the TSA 3.

Subsequently, a process in which the sending server 1b sends a DR request will be described with reference to FIG. 16.

Figure 16:
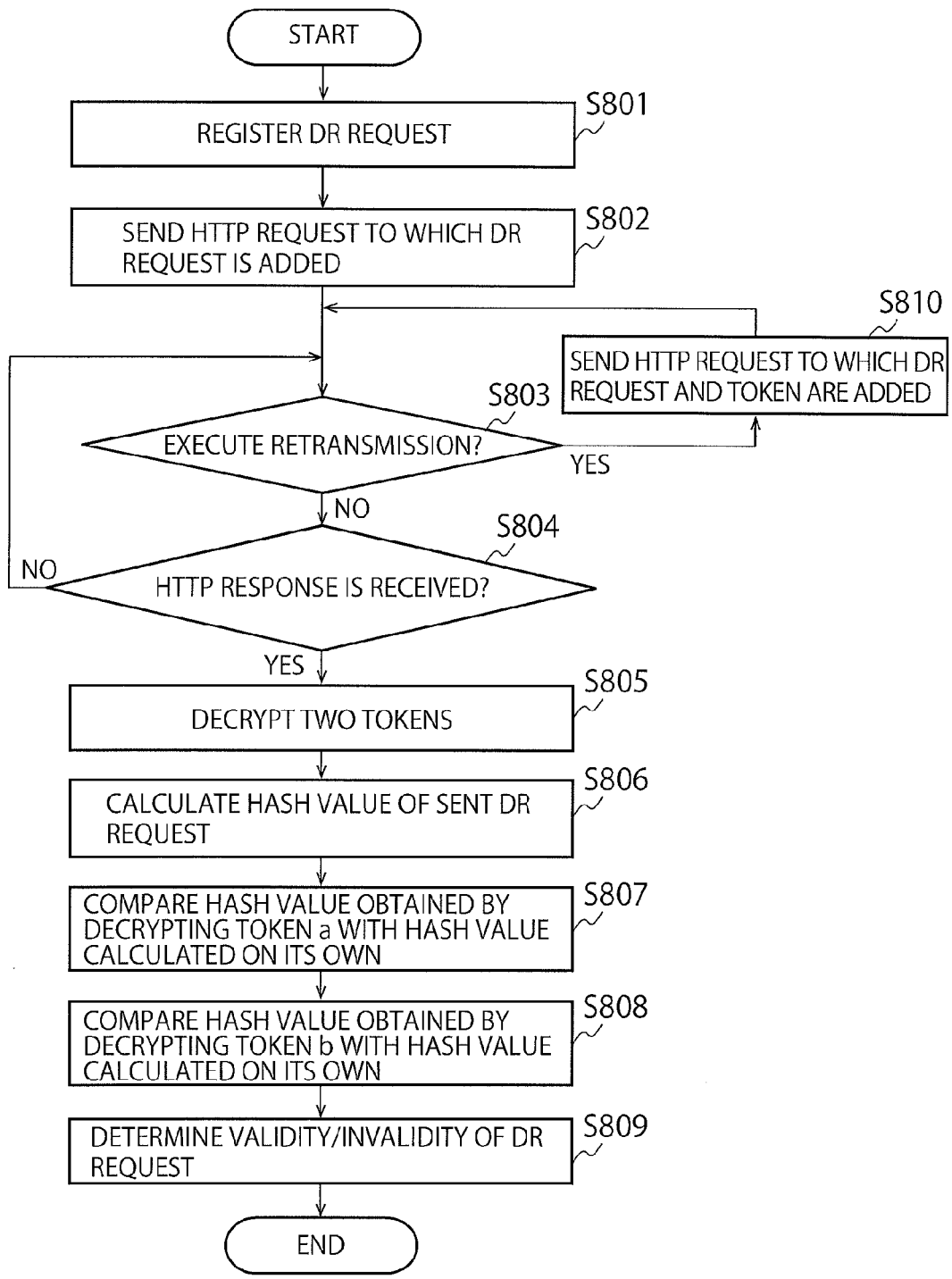
FIG. 16 is a flow chart showing an example of a process in which a sending server 1b sends a DR request.

FIG. 16 is a flow chart showing an example of the process in which the sending server 1b sends the DR request. The process of steps S801 and S802 is the same as the process of steps S301 and S302 in FIG. 9, and will not be described.

(Step S803) Next, the retransmitter 13b determined whether to execute the retransmission execution.

(Step S810) If the retransmitter 13b determines to execute the retransmission in step S803, the controller 16b adds the DR request and the token recorded in the DR request storage 12, to the HTTP request. The location of the addition may be the header field or the body field of the HTTP request. The token to be added is a token that the transfer server 2b returns in the first sending of the DR request. This token should be recorded in the storage device 17, and is obtained by calculating the hash value "hash" ("format" (DR request)) of the DR request. The communicator 11b then sends the HTTP request to which the DR request and the token are added, to the transfer server 2b.

The process of steps S804 to S809 is the same as the process of steps S304 to S309 in FIG. 9, and will not be described.

As seen from the above, if the retransmitter 13b determines to execute the retransmission, the controller 16b adds the DR request and the token recorded in the DR request storage 12 to the HTTP request. The communicator 11b then sends the HTTP request to which the DR request and the token are added, to the transfer server 2b. This allows the transfer server 2b to determine that the DR request is a retransmitted one when the token has been received together with the DR request.

As described above, in the transfer server 2b in the fourth embodiment, when the second demand response request is received by the communicator 21, the creator 22 extracts second request content information (e.g., the second hash value) representing the contents of the second demand response request, from the second demand response request. The time-certification-information acquirer 23 then causes the communicator 21 to send a signal containing the second request content information (e.g., the second hash value) to the TSA 3, and acquires from the TSA 3 the second time certification information (e.g., the token a) containing the time stamp that the TSA 3 has issued for the second demand response request.

The determiner 26 then determines whether the first time certification information (e.g., the token c) has been received together with the second demand response request. If the determiner 26 determines that the first time certification information (e.g., the token c) has been received together with the second demand response request, the controller 27 causes the communicator 21 to send, in addition to the first time certification information (e.g., the token c), the second time certification information (e.g., the token a), to the sending server 1b.

This allows the transfer server 2b, when receiving the retransmitted DR request, to send the first time certification information containing the time stamp that the TSA 3 has issued for the DR request for the first time, and second time certification information containing the time stamp that the TSA 3 has issued for this retransmitted DR request, to the receiving server 4. The first time certification information and the second time certification information are issued by the TSA 3, which allows the transfer server 2b to provide the trustworthy first sending time and the trustworthy retransmission time stamp of the DR request to the receiving server 4 even when the DR request is retransmitted.

Note that, each embodiment is described assuming that the sending server 1 or 1b and the transfer server 2 or 2b are separated apparatuses, but is not limited, they may be configured as an integrated information processing apparatus.

The transfer server (information processing apparatus), the sending server (communication device) and the receiving server (communication device) as described above may also be realized using a general-purpose computer device as basic hardware. That is, each function block (or each section) in the transfer server, the sending server and the receiving server can be realized by causing a processor mounted in the above general-purpose computer device to execute a program. In this case, the transfer server, the sending server and the receiving server may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

Furthermore, the transfer server, the sending server and the receiving server may include a CPU (Central Processing Unit), a ROM (Read Only Memory) and a RAM as circuitry. In this case, each unit or each element in the transfer server, the sending server and the receiving server can be controlled by a CPU's reading out into a RAM and executing a program which is stored in a storage or ROM.

Also, the above-stated hardware configuration is one example and the transfer server, the sending server and the receiving server according to an embodiment can be realized by circuitry. The circuitry may be an integrated circuit such as a LSI (Large Scale Integration) or an IC (Integrated Circuit) chip set. The circuitry may comprise one circuit or a plurality of circuits or a system of circuits. Each function block in the transfer server, the sending server and the receiving server can be realized by respective processors, or a part or all of the function blocks can be integrated and realized by one processor. A means for the integrating the part or all of the function blocks is not limited to the LSI and may be dedicated circuitry or a general-purpose processor.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
   first circuitry configured to receive a first demand response request from a first communication device; and
   second circuitry configured to:
      create first request content information representing contents of the first demand response request, from the first demand response request;
      send the first request content information to a time-stamping authority, and acquire first time certification information that the time-stamping authority sends in response to this sending, the first time certification information including a time stamp that the time-stamping authority issues for the first demand response request; and
      associate the first time certification information with the first demand response request and store the first time certification information in a storage device;
      wherein the first circuitry is configured to transmit the received first demand response request and the first time certification information to a second communication device,
      wherein the second circuitry is configured to, when the first circuitry receives a second demand response request from the first communication device after the first circuitry receives the first demand response request, determine whether the second demand response request is retransmission of the first demand response request; and
      wherein the first circuitry is configured to, when the second circuitry determines that the second demand response request is the retransmission of the first demand response request, send the second demand response request and the first time certification information associated with the first demand response request in the storage device, to the second communication device.

2. The information processing apparatus according to claim 1, wherein
   the second circuitry is configured to create second request content information representing contents of the second demand response request, from the second demand response request,
   the second circuitry is configured to send the second request content information to the time-stamping authority, and acquire second time certification information that the time-stamping authority sends in response to this sending, the second time certification information including a time stamp that the time-stamping authority issues for the second demand response request, and
   the second circuitry is configured to, based on determining that the second demand response request is not the retransmission of the first demand response request, cause the first circuitry to send the second time certification information acquired by the second circuitry and the second demand response request, to the second communication device.

3. The information processing apparatus according to claim 1, wherein the first time certification information includes, in addition to the time stamp that the time-stamping authority issues for the first demand response request, a value corresponding to the first request content information.

4. The information processing apparatus according to claim 3, wherein the first time certification information includes information into which the time-stamping authority encrypts information including the value corresponding to the first request content information and the time stamp that the time-stamping authority issues for the first demand response request.

5. The information processing apparatus according to claim 2, wherein the second time certification information includes, in addition to the time stamp that the time-stamping authority issues for the second demand response request, a value corresponding to the second request content information.

6. The information processing apparatus according to claim 5, wherein the second time certification information includes information into which the time-stamping authority encrypts information including the value corresponding to the second request content information and the time stamp that the time-stamping authority issues for the second demand response request.

7. The information processing apparatus according to claim 4, wherein the encryption by the time-stamping authority includes encryption using a private key in a public-key cryptosystem.

8. The information processing apparatus according to claim 1, wherein
the second circuitry is configured to, when the first demand response request is received by the first circuitry, associate the first request content information with the first time certification information, and control storing the first request content information and the first time certification information in the storage device,
wherein the second circuitry is configured to, when the second demand response request is received by the first circuitry, create second request content information to identify the second demand response request from the second demand response request,
wherein the second circuitry is configured to determine whether the second demand response request is the retransmission of the first demand response request by determining whether request content information identical to the second request content information is stored in the storage device, and
the second circuitry is configured to, based on determining that the request content information identical to the second request content information is stored in the storage device, read the first time certification information corresponding to the request content information identical to the second request content information from the storage device, and cause the first circuitry to send the read first time certification information to the second communication device.

9. The information processing apparatus according to claim 1, wherein
the second circuitry is configured to, when the first demand response request is received by the first circuitry, send the first request content information and the first time certification information to the first communication device such that the first communication device associates the first request content information with the first time certification information and cause the storage device to store the first request content information and the first time certification information,
the second circuitry is configured to determine whether the second demand response request is the retransmission of the first demand response request by determining whether the first time certification information is added to the second demand response request received by the first circuitry, and
the second circuitry is configured to, based on the first time certification information being added to the second demand response request, cause the first circuitry to send the added first time certification information to the second communication device.

10. The information processing apparatus according to claim 9, wherein
the second circuitry is configured to, when the second demand response request is received by the first circuitry, extract second request content information to identify the second demand response request from the second demand response request, and
the second circuitry is further configured to verify whether the first time certification information is correct using the added first time certification information and the second request content information.

11. The information processing apparatus according to claim 10, wherein the second circuitry is configured to decrypt the added first time certification information using a public key distributed from the time-stamping authority, and verify whether the first time certification information is correct by comparing a decrypted value with the second request content information.

12. The information processing apparatus according to claim 1, wherein
when the second demand response request is received by the first circuitry,
the second circuitry is configured to extract the second request content information representing the contents of the second demand response request, from the second demand response request,
the second circuitry is configured to cause the first circuitry to send a signal including the second request content information to the time-stamping authority, and acquire from the time-stamping authority third time certification information including a time stamp that the time-stamping authority issues for the second demand response request, and
the second circuitry is configured to, based on determining that the second demand response request is the retransmission of the first demand response request, cause the first circuitry to send, in addition to the first time certification information, the third time certification information to the second communication device.

13. The information processing apparatus according to claim 1, wherein
the second circuitry is configured to:
extract first definition information to define the first demand response request, and second definition information to define the second demand response request;
format the first definition information and the second definition information; and calculate a hash value of the formatted first definition information as the first request content information, and calculate a hash value of the formatted second definition information as the second request content information.

14. The information processing apparatus according to claim 13, wherein the second circuitry is configured to
change information to be extracted according to a protocol of a demand response, and
change a formatting method according to the protocol of the demand response.

15. The information processing apparatus according to claim 1, wherein the retransmission of the first demand response is performed by the first communication device when the first communication device detects that the transmission of the first demand response to the second communication device fails.

16. An information processing apparatus comprising:
first circuitry configured to communicate with a communication device; and
second circuitry configured to:
when a first demand response request is to be sent from the first circuitry to the communication device, create first request content information representing contents of the first demand response request, from the first demand response request;
send the first request content information to a time-stamping authority, and acquire first time certification information that the time-stamping authority sends in response to this sending, the first time certification information including a time stamp that the time-stamping authority issues for the first demand response request; and
associate the first time certification information with the first demand response request in a storage device;
wherein the first circuitry is configured to transmit the first demand response request and the first time certification information to the communication device,
wherein the second circuitry is configured to determine whether a second demand response request to be send to the communication device subsequent to the first demand response request is retransmission of the first demand response request; and
wherein when the second circuitry determines that the second demand response request is the retransmission of the first demand response request, the first circuitry is configured to send the second demand response request and the first time certification information associated with the first demand response request in the storage device, to the communication device.

17. The information processing apparatus according to claim 16, wherein the second circuitry is configured to, when the transmission of the first demand response to the communication device fails, determine to retransmit the first demand response request as the second demand response request, and the first circuitry is configured to send the second demand response request and the first time certification information associated with the first demand response request in the storage device, to the communication device.

18. A communication device comprising:
first circuitry configured to send a demand response request to an information processing apparatus, and acquire, from the information processing apparatus, time certification information including a time stamp that a time-stamping authority issues for the demand response request in response to this sending; and
second circuitry configured to:
cause a storage device to store the time certification information received by the first circuitry; and
when the second circuitry determines to retransmit the demand response request, read the time certification information stored in the storage device, and
wherein the first circuitry is configured to retransmit the demand response request together with the read time certification information to the information processing apparatus.

19. The communication device according to claim 18, wherein the second circuitry is configured to, when the transmission of the demand response to the information processing apparatus fails, determine to retransmit the demand response request and the first circuitry is configured to retransmit the demand response request together with the read time certification information to the information processing apparatus.

* * * * *